(12) United States Patent
Shkedy

(10) Patent No.: US 6,260,024 B1
(45) Date of Patent: Jul. 10, 2001

(54) METHOD AND APPARATUS FOR FACILITATING BUYER-DRIVEN PURCHASE ORDERS ON A COMMERCIAL NETWORK SYSTEM

(76) Inventor: Gary Shkedy, 455 E. 86th St., Apt. 22A, New York, NY (US) 10028

( * ) Notice: Subject to any disclaimer, the term of this patent is extended or adjusted under 35 U.S.C. 154(b) by 0 days.

(21) Appl. No.: 09/203,843

(22) Filed: Dec. 2, 1998

(51) Int. Cl.[7] .................................................. G06F 17/60
(52) U.S. Cl. .............................. 705/37; 705/10; 705/28; 705/23; 705/26
(58) Field of Search .................................. 705/28, 10, 35, 705/26, 23, 25, 14, 44, 37; 380/25, 23

(56) References Cited

U.S. PATENT DOCUMENTS

| | | |
|---|---|---|
| 4,903,201 | 2/1990 | Wagner . |
| 5,191,613 | 3/1993 | Graziano et al. . |
| 5,794,207 | * 8/1998 | Walker et al. ......................... 705/23 |
| 5,794,219 | 8/1998 | Brown . |
| 5,835,896 | 11/1998 | Fisher et al. . |

FOREIGN PATENT DOCUMENTS

411748 * 6/1991 (EP) .

OTHER PUBLICATIONS

Murray, John E Jr, When a contract is not a contract, PP 1–3, Dec. 1996.*
Wall street Journal, Eastern edition, PP 1–3, Apr. 1991.*
Structuring an Acquistion Strategy, Green, Janet M, PP 1–6, Dec. 1992.*
Like going to the grocery store, Credit Card Management, James J Daly, PP 1–6, Aug. 1997.*
The buyer can't lose, Purchasing, Murray John, PP 1–3, Feb. 1997.*
Search Report of International Appln. No. PCT/US99/28507.

* cited by examiner

Primary Examiner—James P. Trammell
Assistant Examiner—Mussie K. Tesfamariam

(57) ABSTRACT

Systems and methods are described for providing a global bilateral buyer-driven system for creating binding contracts by incorporating various methods of communication, commerce and security for the buyers and the sellers. Individual buyers purchase requirements are aggregated into a single collective purchase requirement and sellers are located willing to bid on the collective purchase requirement. A central controller facilitates the buyer/seller transaction by fielding binding offers from buyers, aggregating those offers into group (i.e. pooled) offers and communicating those group offers globally in a format which can be efficiently accessed and analyzed by potential sellers. This system can also effectuate performance of resulting contracts, resolve disputes arising from those contracts, and maintain billing, collection, authentication, and anonymity. The methods disclosed are applicable to any commerce situation involving buyers and sellers.

37 Claims, 18 Drawing Sheets

METHOD AND APPARATUS FOR FACILITATING BUYER-DRIVEN PURCHASE ORDERS ON A COMMERCIAL NETWORK SYSTEM

BACKGROUND OF THE INVENTION

1. Field of the Invention

The method and apparatus of the present invention relates to electronic commerce network applications and, more particularly, to a system and method for facilitating a transaction between a plurality of buyers, an intermediary, and a plurality of sellers over an electronic network.

2. Background

The purchase of goods and services in an electronic/telephone network, such as the Internet has gained acceptance by a large segment of the population. Market forecasts indicate that E-commerce will gain widespread usage as a medium for commercial transactions among buyers and sellers. Numerous Internet purchase websites are currently available. The majority of these sites may be classified as seller driven. The traditional retail commerce model is one example of a seller driven protocol characterized by a product offer by a large number of manufacturers to a mass market of consumers via a range of intermediary retail channels (sellers). The retail model is said to be seller driven in that a seller must utilize various methodologies, including advertising, packaging, and pricing, to attract potential buyers. Further, in a seller driven model the seller assumes all risks and costs associated with consummating a sale.

With an ever increasing number of retailers implementing electronic commerce solutions, such as electronic malls, catalogs and auction houses, the seller driven protocol is carried over into that realm. In the electronic commerce model, it is undisputed that the customer exercises a greater degree of control over the transaction as compared to the conventional retail model, however, it is equally undisputed that the protocol remains primarily seller driven.

In single seller-driven systems, a particular seller sets a price and the buyer decides whether he will accept that price. If the buyer happens to be a very large consumer of that particular item, he may be able to negotiate a bulk discount, thereby achieving an effective cost saving. However, the vast majority of retail purchases are fixed price and non-negotiable.

An example of a commerce system where the seller does not set a fixed, non-negotiable price is an auction. However, the seller still exercises a certain amount of control as he can set a minimum bid or offer the goods subject to a reserve. (See e.g. www.onsale.com) The auction protocol may be characterized as a multi-buyer, single-seller quasi-bidirectional system, in that no single buyer sets the price, it is determined by the group of buyers as a whole. In this protocol buyers are not acting in unison but rather as adversaries, competing against each other for the best 'winning' bid and purchase.

A buyer-driven system is one in which the buyer is looking for the seller of a particular goods or service. It is the buyer who sets the terms of the sale. In this case, the buyer assumes most of the costs and risks in consummating the deal, but now is able to exercise more control in the specification of product required and the price he is willing to pay. For example, a buyer through the classified section seeks an apartment to rent or a house to buy in a specific neighborhood at a specified price.

Buyer-driven protocols are available on the Internet. (See, e.g. www.priceline.com) . These protocols allow buyers to define a conditional purchase offer. The buyer selects the particular item he wishes to purchase, adds any conditions he wishes to place on the purchase and specifies a price at which he will purchase. He then transmits this conditional purchase offer to a central computer. Suppliers then search a list of conditional purchase offers and select the ones they are willing to bind. In effect, the site owner provides a mechanism for binding the buyer and seller to an electronic contractual agreement.

The problem with the above system is that the buyer is now accepting all the risk in determining a fair price for the goods and services he requires. If he provides a low bid, no seller would choose to bind his contract. On the other hand, if he overbids, sellers would jump at the opportunity to enter into a binding contract with him. Also, if he overspecifies the conditions of his offer, he may never be able to find a seller willing to offer him the goods. Currently, Priceline.com allows buyers to specify the day they are willing to fly but not the particular time/flight they require. Thus buyers may be bound to accept a connecting flight at 6 a.m. U.S. Pat. No. 5,794,207 to Walker et al. describes a protocol seen on Priceline.com. The disclosure of the '207 patent is incorporated by reference herein.

In a buyer driven system, it is well known that through the principles of supply and demand, a buyer who can buy in bulk can command a better leverage in negotiating a better price. For example, buyers from Costco or Kmart can likely negotiate a better price for a particular goods from a manufacturer because of the large quantities they can purchase, especially on commodities or commodity services (such as detergents, insurance plans or even automobiles). However, individual consumers do not have the buying power or resources to effectively participate in such bilateral buyer-driven systems.

A buyers club concept, e.g. Costco, where buyers pay a membership fee to join a club to pool the buying power of members, supposedly allows the buyer to achieve some cost saving. However, the club (the intermediary) still acts as a seller, in that it selects the goods to purchase and offers those goods to members at a discounted price. In reality this is still a seller protocol.

Despite all the advances in technology, the applicant is not aware of a commercially viable bilateral multi buyer-driven multi-seller system. That is, a system in which buyers would pool purchase orders of like kind to achieve the buying power and leverage of in-bulk buying. Depending on the size of the pool, there may be a requirement for several sellers to bid on subsets of the pooled purchase order ("PPO"). The net result is that buyers always achieve a better deal (pricing or services) than if they had entered into the contract individually.

A key element in achieving success is the ability to bind the individual buyer to the pool before the purchase is made. If buyers could participate in the pool and only decide whether they wish to purchase the goods once they have been given a price, it becomes impossible to guarantee the price since the volume changes depending on the number of buyers remaining in the pool.

There is also a need for a third party to administer such bilateral multi buyer-driven system. The third party can administer an Internet site where buyers can aggregate their orders into a large pooled purchase order. Also, this third party can act as an agent for all the buyers and achieve economies of purchasing usually only achieved by large retailers or corporations. Also, a central site for the global purchase order facilitates a venue for sellers to search for appropriate orders to bid on.

Therefore, it is one object of the present invention to set forth a system of bilateral multi buyer-driven electronic commerce that offers the capability for individual buyers to aggregate their purchase orders into pooled orders to potential sellers to bid on.

Another object of the present invention is to allow an intermediary to bind all buyers to the pool before the sale or bidding occurs.

Another object of the present invention is to allow an intermediary to bind the seller who meets the terms of the pooled purchase order to the seller's fulfillment of that order.

It is another object of the present invention for the intermediary to guarantee payment to the seller, with payment occurring at or after delivery of the goods or called for in the pooled purchase order.

It is yet another object of the present invention to allow either buyers or sellers to remain anonymous whereby characteristics and profile information on buyers or sellers are shielded from others such as marketing personnel or credit card companies.

A further object of the invention is to provide a system in which the identity of the buyer is authenticated along with the integrity of the buyer's purchase order.

Another object of the invention is to provide a system in which the identity of the seller is authenticated to determine the seller's capacity to satisfy the conditions of the purchase order.

It is another object of the present invention to allow for pooled purchase orders where multiple sellers may jointly bid to fulfill the purchase order.

These and other objects of the invention will he apparent to those skilled in the art from the following detailed description of the invention, the accompanying drawings and the appended claims.

SUMMARY OF THE INVENTION

In one aspect of the invention, a method for using a computer acting as an intermediary to facilitate a transaction between a plurality of buyers and at least one seller comprises the steps of: a buyer determining an item or service to be purchased, the buyer inputting a conditional purchase order to a central controller (i.e. intermediary party) for the item or service, receiving a maximum offer price in response to the conditional purchase order from the central controller, the buyer either accepting or rejecting the maximum offer price from the central controller. If the buyer accepts the maximum offer price, the buyers' conditional purchase order is combined into a pooled purchase order with other buyers. The pooled purchase order is then made available to sellers to bid on. Any sellers interested in the pooled purchase order will submit a bid including a bid price that is responsive to the conditional pooled purchase order, including the maximum offer price. A seller will be selected whose bid is the best, e.g. lowest price. Payment can be provided by the intermediary to the seller having the lowest bid.

The method and device of the present invention advantageously provide individuals with a collective bargaining power usually reserved for large retailers or corporations that regularly exercise buying clout by virtue of their size. By aggregating individual purchase orders into a single aggregate purchase order, each individual participant will receive more favorable purchasing terms than what could be achieved by acting independently. By using an intermediary to perform the buying or shipping of goods, buyers can keep their buying habits and preferences confidential.

These and other objects, features and advantages of the present invention will become apparent from the following detailed description of illustrative embodiments thereof, which is to be read in connection with the accompanying drawings in which the same reference numerals are used throughout the various figures to designate same or similar components.

DETAILED DESCRIPTION OF EMBODIMENTS OF THE INVENTION

A system and method according to the present invention is provided that aggregates individual buyers purchase orders into one or more collective purchase order(s) and solicits sellers to bid on the collective purchase order(s). The invention provides a global bilateral buyer-driven system by methods of communication, commerce and security for the buyers and the sellers by aggregating orders into group orders and communicating those group orders globally in a format which can be efficiently accessed and analyzed by potential sellers. Other aspects of this system effectuate performance of resulting contracts, and maintain billing, collection, authentication, confidentiality and anonymity.

Figure 1:
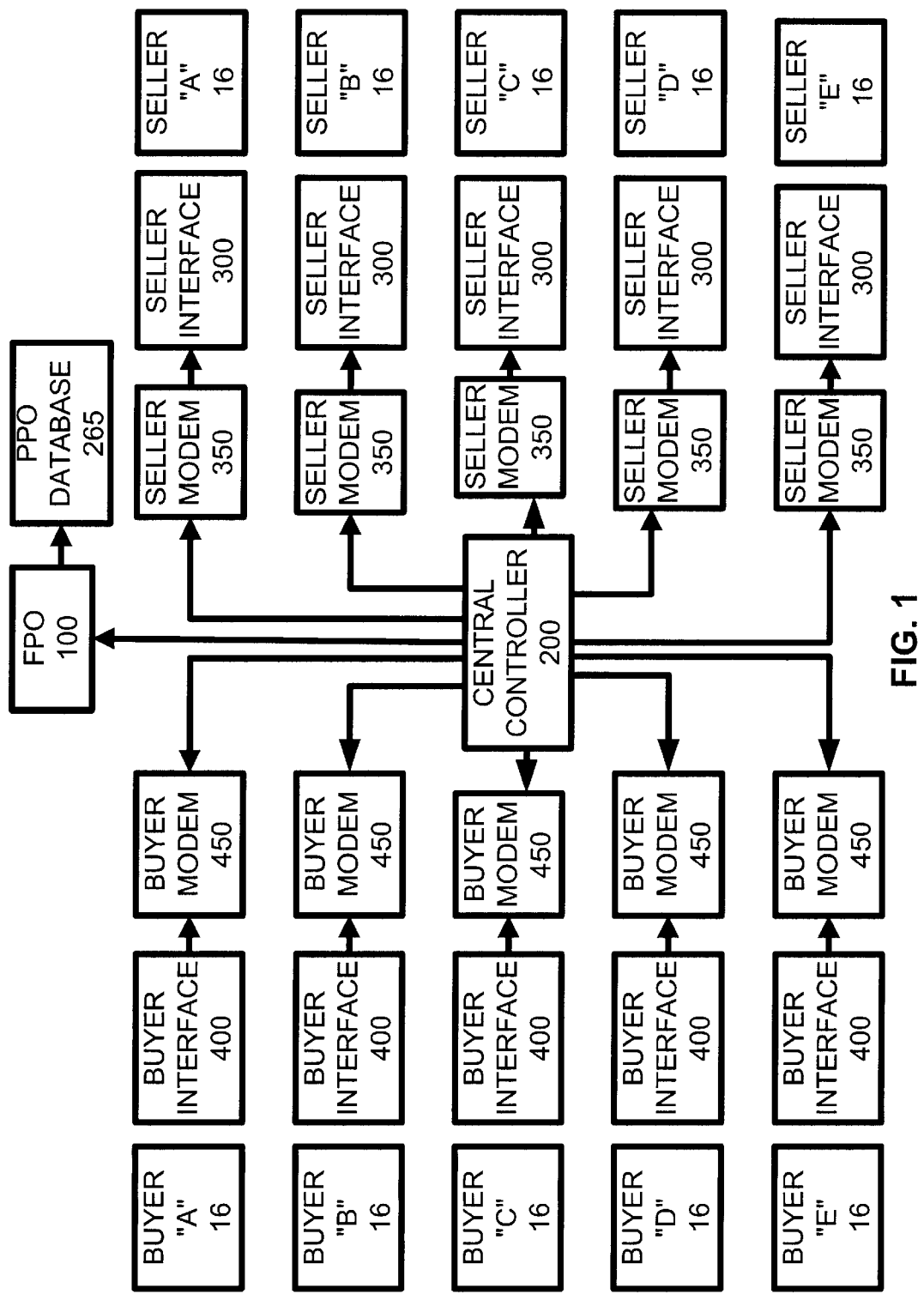
FIG. 1 is a block diagram illustrating an electronic network in accordance with an embodiment of the present invention.
Figure 2:
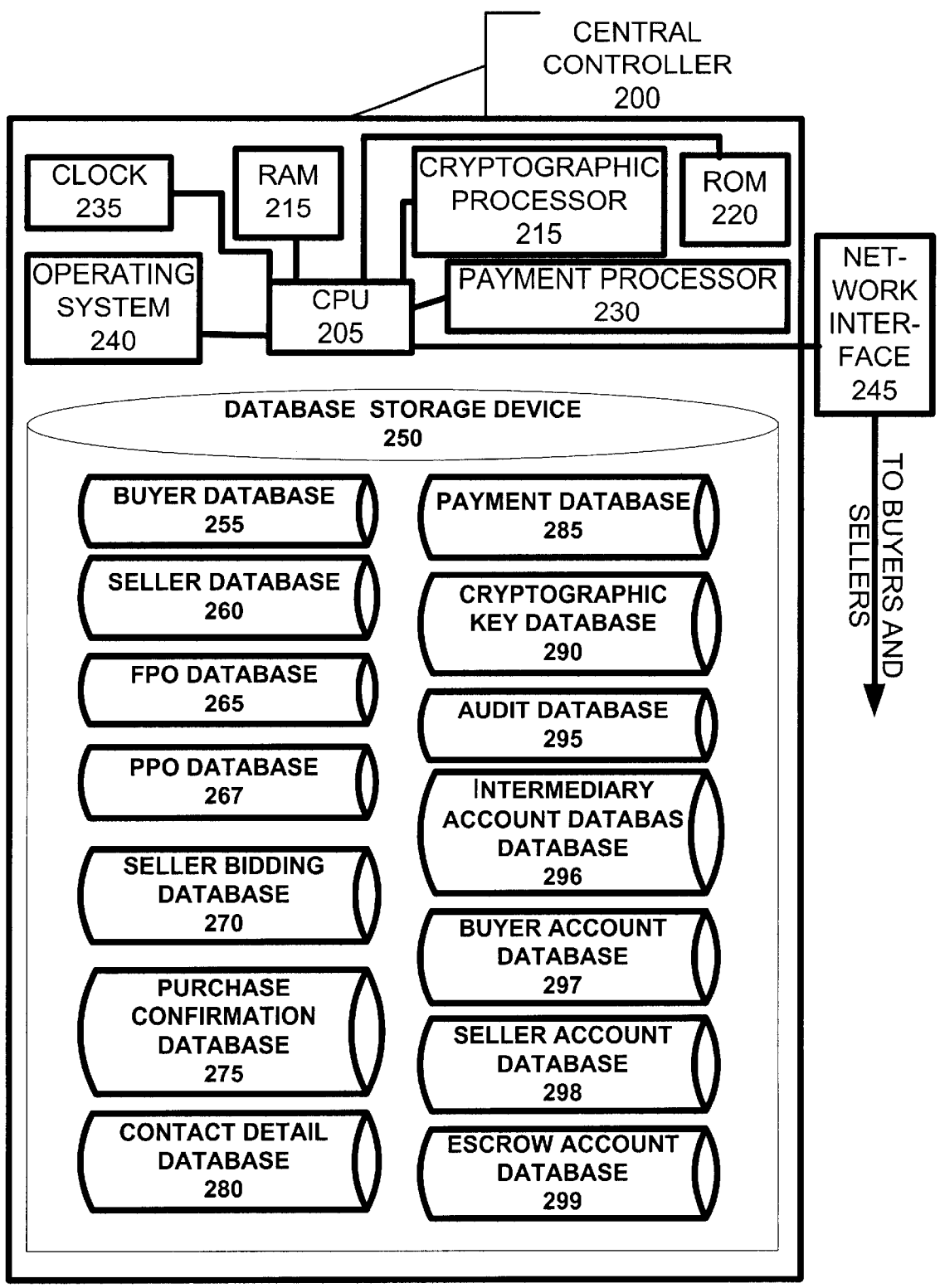
FIG. 2 is a block diagram showing an embodiment of the central controller.
Figure 2A:
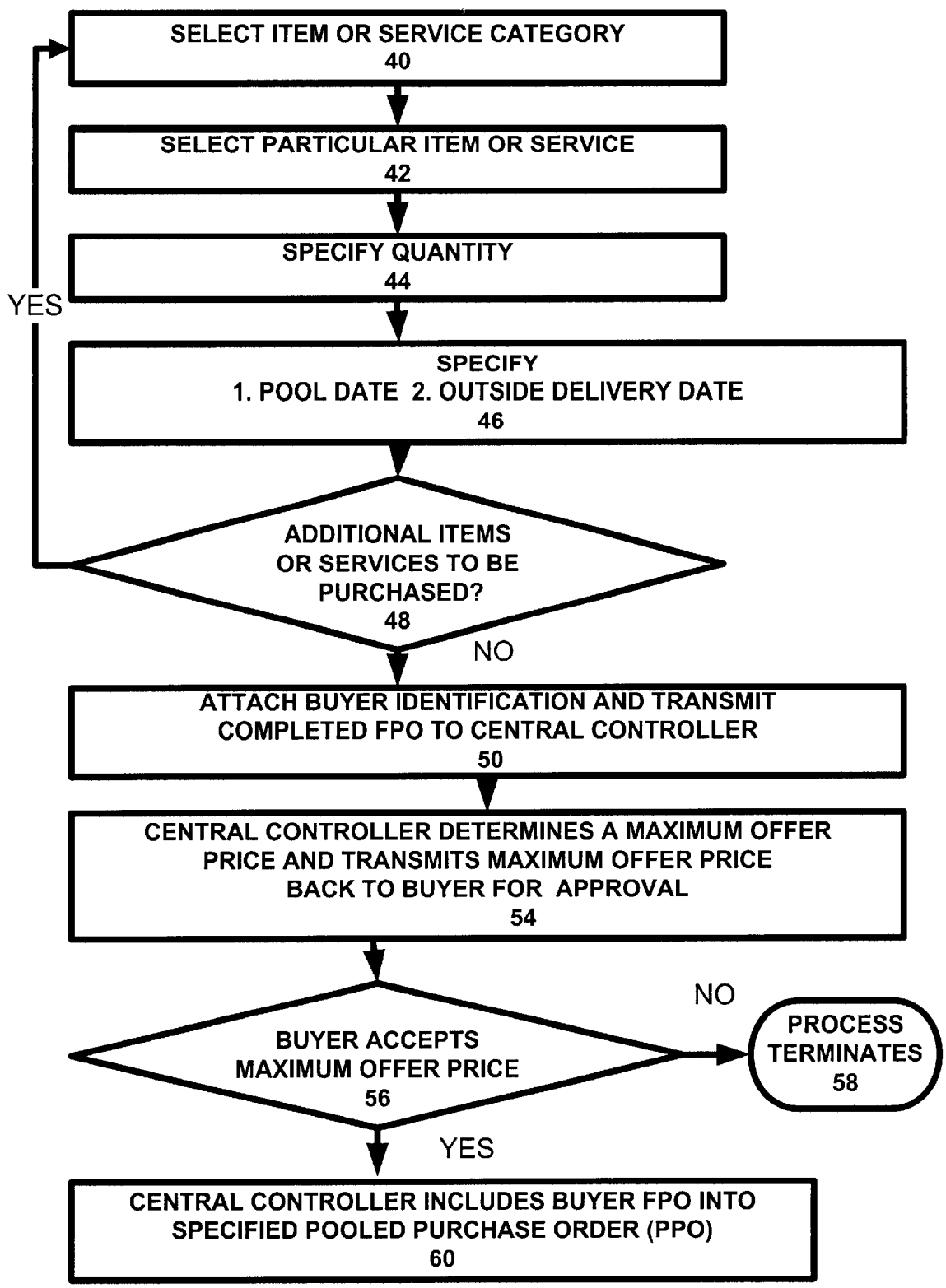
FIG. 2a is a flowchart illustrating of a method of creating an FPO for inclusion into a PPO database according to the invention.
Figure 2A:
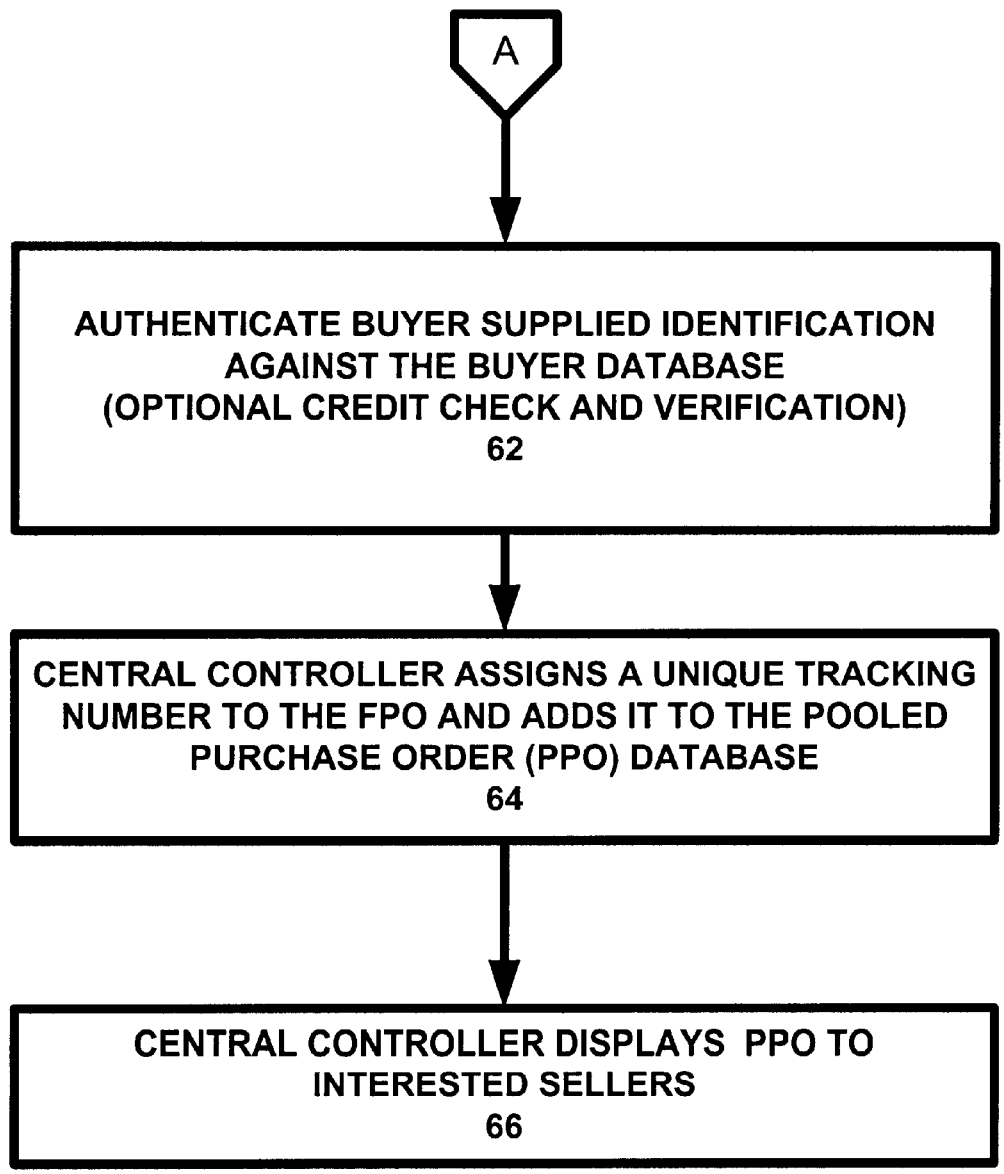

Referring now to FIGS. 1 and 2a, and in particular to FIG. 1, in a preferred embodiment, an electronic network including a central controller 200 is shown. The network facilitates communications between a plurality of buyers and a plurality of sellers through an intermediary (i.e. central controller 200). FIG. 1 illustrates a plurality of buyers electronically coupled to central controller 200 with buyer modems 450, the central controller 200 is electronically coupled to a plurality of seller through seller modems 350 and sellers 300. Each of the plurality of buyers who wish to make purchases independently access the central controller 200 to create forward purchase orders(FPOs) to submit their purchase orders for items and/or services. The central controller 200 is preferably located at a remote server.

FIG. 2a illustrates the steps associated with the creation, transmission and inclusion of an FPO 100 into the PPO database 265. At step 40, a buyer selects the category of goods or service to be purchased. At step 42, the buyer selects the particular item or service in the category. At step 44, the buyer 16 adds a quantity specifier along with any other required buyer specified conditions. At step 46, a buyer will specify along with item, quantity, and buyer identification data, the pool date (i.e. seller bidding date) he wishes to participate in and an outside delivery date. The pool date represents the specific date at which the central controller (intermediary) 200 will make the PPO 110 available to the sellers for bidding. A buyer will typically have a choice of two or more pool dates from which to choose. He must, however, select only a single pool date into which his FPO 100 will be included. If his FPO comprises multiple categories of goods, he could, however, provide a single pool date per category.

At step 48, the buyer is prompted for possible additional items or services that he wishes to purchase. If so, steps 40–46 are repeated for each additional item or service to be purchased, otherwise at step 50, the buyer attaches his user identification to the FPO and transmits the FPO to the central controller 200.

A typical buyer created forward purchase order, FPO 100, could, for example, specify that the buyer wishes to purchase two dozen BIC medium point black roller ball pens and one dozen BIC medium point blue roller ball pens. The buyer would also specify that he wants to participate in the Friday Nov. 6, 1998 at 12pm EST pool, and need the goods delivered no later than Tuesday Nov. 10, 1998. Instead of specifying a delivery date, a buyer could optionally be satisfied with the earliest possible delivery date for the item or service in question. Alternatively, the buyer could have also used a catalog to determine the item number.

At step 54, the central controller 200 determines a maximum offer price for the submitted FPO 100 and transmits that price back to the buyer. The central controller 200 may add legal language to the FPO 100 to make it explicit to the buyer that should the buyer accept the maximum offer price he will be entering into a binding agreement. Step 56 is a determination step for the buyer 16 to decide whether he is willing to accept the maximum offer price provided by the central controller 200. If not, the FPO 100 creation process terminates at step 58. Otherwise, if the buyer accepts the maximum offer price his FPO 100 will be included in the pool purchase order at step 60 by transmitting his intention to accept to the central controller 200. The buyer has now consented to entering into a legally binding contract with the intermediary and will accept the best price that the intermediary determines in the bidding process subject to the condition that the buyer will pay no more for the item or service than the stipulated maximum offer price.

At step 62, before adding the FPO 100 to a PPO 110, central controller 200 authenticates the buyer's identification number against a buyer database. The central controller 200 may require that the buyer provide a credit card number and may also ensure that the buyer has sufficient credit available to cover the purchase price specified in the FPO 100 by contacting a credit card clearinghouse. Once a buyer is authenticated and credit worthy, at step 64, the central controller 200 assigns a unique tracking number to the FPO 100 and adds it to the pooled purchase order database. At step 66 the central controller 200 publishes or displays the PPO 110 in a manner accessible by potential sellers. For example, on a website on the Internet. The central controller may display the PPO database 265 by category to make it easier for potential sellers to identify PPOs relevant to their products. Furthermore, before displaying a PPO 100 to a seller, the central controller 200 could add legal language to make it explicit to the seller that he is entering into a binding contract. Thus, a seller could log onto the website, for example, and see a listing of PPO categories. The seller could then choose a particular category and have the ability to browse PPOs which correspond to that category. In one embodiment, the seller may be required to provide qualifications in order to view the PPOs of a given category.

If after reviewing a particular PPO a potential seller wishes to make a bid, the seller communicates his intent to the central controller 200. The central controller 200 then time-stamps the message from the seller and authenticates the identity of the seller and his capacity to deliver the goods defined by the PPO. The system then verifies that the particular PPO is still "active" and capable of being bid on. If a seller bids on an active PPO, a unique tracking number is assigned to the seller's bid and the bid is stored in a database. The seller has now entered into a legally binding contract with the intermediary.

In the event that a seller is awarded the bid, the central controller 200 will send a purchase confirmation to the seller. Once the transaction has been completed i.e. the goods have been delivered, the intermediary will pay the seller preferably in a single payment for the total cost of the PPO. This would represent substantial savings to the seller in transaction costs and may encourage him to lower his bid. The payment may be made by the intermediary in any number of ways including using a credit card, electronic funds transfer, corporate purchasing card, corporate purchase order etc.

Under the present invention, communications between the various parties may be transmitted via numerous means including a world-wide-web interface, personal digital assistant (PDA), electronic mail, voice mail, facsimile, or postal mail. Other means not explicitly enumerated herein but known to one ordinarily skilled in the art are also within the scope of the invention.

In another embodiment, as a substitute for making the PPO database 265 globally available to a plurality of sellers, the central controller 200 could instead pro-actively contact potential sellers to explicitly request them to bid on the PPOs in the PPO database 265.

The central controller 200 manages the payment system between the buyer and seller automatically. Various methods of payment may be utilized by the invention including credit cards, personal checks, electronic funds transfer, debit card, money orders, corporate purchasing cards, smart cards, digital cash and micropayments. The payment system may also involve the use of an escrow account associated with the buyer wherein funds advanced by the buyer to cover the purchase of a desired good can be kept pending delivery of the goods by the selected seller 20. Moreover, the timing of payment to the seller can be varied.

The present invention can also be practiced in off-line embodiments. Instead of using electronic mail or web-based servers, buyers and seller may communicate with the central controller 200 via telephone, facsimile, postal mail, or another off-line communication tool. For example, buyers may use telephones to create FPOs 100 (with or without the assistance of live agents) and potential seller may use a telephone to browse and bid on PPOs.

Cryptographic protocols are provided to authenticate the identity of buyers and/or sellers and verify the integrity of buyer and seller communications with the central controller 200. The use of cryptography, smart cards and biometrics can make it significantly more difficult for unauthorized persons to tamper with the system by passing themselves off as legitimate buyers or sellers or eavesdropping on system communications.

In another on-line embodiment, either buyer or the seller or the central controller 200 could use intelligent software agents to accomplish all or some of the buyer/seller communications with the central processor. Thus the central processor provides a meeting place for such agents to congregate and aggregate. The central controller 200 could then create a super agent that would be used to find the most competitive bid for the pool.

In one embodiment of the present invention buyers could indicate a minimum discount off the maximum offer price provided by the central controller 200 that a buyer would be willing to accept. The seller would then be notified of a maximum price he had to beat in order to bid.

In another embodiment of the present invention, the intermediary could pre-negotiate a supply contract with a major supplier, prior to forming the buyer pool. Prospective buyers could view the pre-negotiated contract as a criterion for deciding whether or not they wish to participate in the pool. The pre-negotiated seller contract terms would be automatically available to any individual who joins the pool. In this embodiment, the intermediary pre-negotiates a contract with a seller such as an office supply company whereby the terms of the contract specify that the office supply company would beat any published competitors price and provide an additional 5% discount to the collective buyer pool on condition that the intermediary (i.e. collective buyer pool) exclusively purchase supplies from them for a whole year. Under this scenario, the pool is unconditionally guaranteed an up-front cost savings.

In another embodiment, the buyer authorization can be split into a multi signing process. This would require that the FPO 100 be signed by multiple individuals before it can be a legally binding contract. This is especially important for larger organizations that require multiple authorizations on any purchase.

One embodiment of the present invention divides the functionality of the central controller 200 into three components and embodies them in three separate servers: an operations server, a certificate authority, and a settlement server. The certificate authority authenticates the identity of buyers and sellers while the settlement server verifies their ability to pay or deliver goods. The operations server posts FPOs, PPOs and bids relying upon messages from the other two servers for validation. This configuration allows greater specialization of the servers.

In one embodiment of the present invention buyers would select a second or substitute item in addition to a primary item choice. The substitute item serves to effectively increase buyer leverage in the bidding process as sellers would be made aware of the substitution effect and may take appropriate steps (i.e modify terms, offer better pricing) toward not losing a potential sale to a competitor. This substitution effect takes on increasing importance when the manufacturer is the seller 20. For example, in the case of a computer manufacturer, if the required peripherals for both a Dell Computer Corporation 400 MHz Pentium PC and a Compaq Corporation 400 MHz PC were similar, the intermediary would have increased leverage in negotiating the best deal for the pool.

In another embodiment of the present invention the central controller 200 does not specify a maximum offer price, but would instead specify a commission and/or a cancellation fee to the buyer for entering the pool. The specification of the fees satisfies the legal requirement for consideration. This embodiment could be extremely useful for the intermediary to negotiate services for the pool. An example of this could be the negotiation of medical benefits for a large pool of small businesses.

Another embodiment of the present invention does not require a transfer of funds from a buyer to a seller. Instead, the system may be used to consummate a contract involving an exchange of goods, services, or other non-monetary consideration.

A further embodiment of the present invention includes a mechanism for resolving disputes between buyers and sellers arising out of agreements consummated using the system. The parties may be required in FPOs and bids to stipulate to binding arbitration and may be assisted in the arbitration process by the central controller 200. The central controller 200 may serve as an arbitrator or may refer the dispute to a third-party arbitrator for resolution.

The present invention is a highly effective bilateral multi buyer-driven commerce system which improves the ability of buyers to achieve the purchasing power heretofore made exclusively available to very large organizations. The present invention provides numerous unique advantages including anonymity. For numerous privacy and competitive reasons, buyers and sellers often prefer not to have their identities revealed to the general public when engaging in commercial transactions. The present invention effectuates the anonymity of buyers and sellers through the use of identification numbers stored in a database secured by the central controller 200.

The method and apparatus of the present invention will now be discussed with reference to FIGS. 1,2,3, and 4. In a preferred embodiment, the present invention includes central controller 200, seller interface 300, buyer interface 400, and associated databases. The present invention receives forward purchase orders from buyers, creates pooled purchase orders, makes the pooled purchase orders available for viewing by potential sellers, and allows sellers to bid on them. A buyer is able to communicate his commitment to the pool. The intermediary is able to communicate its ability to follow through on an order to a seller, giving the seller confidence that if he can produce the goods at the best price, the intermediary (the buyer pool) has the ready capacity to pay.

The system architecture of a preferred embodiment of the apparatus and method of the present invention is illustrated with reference to FIGS. 1 through 4. As shown in FIG. 1, an apparatus of the present invention comprises seller interface 300, central controller 200, and buyer interface 400 (collectively the "nodes"). Each node is connected via an Internet connection using a public switched phone network, such as those provided by a local or regional telephone operating company. Connection may also be provided by dedicated data lines, cellular, Personal Communication Systems ("PCS'), microwave, or satellite networks. Other embodiments may use other known means of communication not enumerated herein. Seller interface 300 and buyer interface 400 are the input and output gateways for communications with central controller 200.

Using the above components, the present invention provides a method and apparatus to post forward purchase orders, create pooled purchase orders, make them available to potential sellers, and allow sellers to bid on the orders.

As shown in FIG. 2, central controller 200 includes central processor (CPU) 205, cryptographic processor 210, RAM 215, ROM 220, payment processor 230, clock 235, operating system 240, network interface 245, and data storage device 250.

A conventional personal computer or computer workstation with sufficient memory and processing capability may be used as central controller 200. The memory may be in the form of a hard disk, CD ROM, or equivalent storage medium. The memory stores data including program codes for causing the processor to operate the steps and functions of the present invention. In one embodiment it operates as a web server, both receiving and transmitting FPOs 100 generated by buyers. Central controller 200 is capable of high volume transaction processing, performing a significant number of mathematical calculations in processing communications and database searches. A Pentium II class processor, commonly manufactured by Intel Inc., may he used for CPU 205.

An MC68HC16 micro-controller, commonly manufactured by Motorola Inc., or any equivalent may he used for cryptographic processor 210. Cryptographic processor 210 supports the authentication of communications from buyers and sellers, as well as allowing for anonymous transactions. Ideally, cryptographic processor 210 may also be configured as part of CPU 205. Other commercially available specialized cryptographic processors include VLSI Technology's 40 MHz VMS110.

Referring again to FIG. 2, payment processor 230 comprises one or more conventional microprocessors (such as the Intel Pentium II), supporting the transfer and exchange of payments charges, or debits, attendant to the method of the apparatus. Payment processor 230 may also be configured as part of CPU 205. Processing of credit card transactions by payment processor 230 may be supported with commercially available software, such as the Secure Webserver manufactured by Open Market, Inc. This server software transmits credit card numbers electronically over the Internet to servers located at the Open Market headquarters where card verification and processing is handled. Their Integrated Commerce Service provides back-office services necessary to run Web-based businesses. Services include on-line account statements, order-taking and credit card payment authorization, credit card settlement, automated sales tax calculations, digital receipt generation, account-based purchase tracking, and payment aggregation for low-priced services.

Data storage device 250 may include hard disk magnetic or optical storage units, as well as CD-ROM drives or flash memory. Data storage device 250 contains databases used in the processing of transactions in the present invention. These include buyer database 255, seller database 260, FPO database 265, PPO database 267, seller bidding database 270, purchase confirmation database 275, contract detail database 280, payment database 285, cryptographic key database 290, and audit database 295. In a preferred embodiment database software such as Oracle8, manufactured by Oracle Corporation, is used to create and manage these databases. Data storage device 250 also stores information pertaining to intermediary account 286, buyer account 297, seller account 298, and escrow account 299.

Buyer database 255 maintains data on buyers with fields such as name, address, telephone number, credit card number, ID number, social security number, electronic mail address, smart card ID, credit history, public/private key information etc. This information is obtained when the buyer first registers with the system, or immediately prior to posting his first FPO 100. Buyer database 255 also contains the tracking number of each FPO 100 generated by the buyer, and the tracking number of each pooled order 110 that comprises the buyer's FPOs 100.

Seller database 260 maintains data on sellers with fields such as name, contact information, public/private key information, payment preferences, type of business, and goods sold. Contact information comprises a phone number, web page URL, pager number, telephone number, electronic mail address, voice mail address, facsimile number, or any other way to contact the seller. It also contains data regarding the items the seller can deliver with fields such as item ID, current price, restrictions on sale and discount schedule for large quantities etc. Upon registration, the seller may be required to demonstrate evidence of ability to deliver on goods in each category. A distributor, for example, might submit a listing of the items he provides so that central controller 200 can quickly determine whether the distributor is capable of satisfying a given PPO 110.

Item database 262 maintains data on all items that can be added to FPOs by buyers. It has fields such as item ID, description, category, photo (if applicable), ceiling price etc. This database is the catalog of items available for sale by sellers. If an item does not exist, buyers may be able to add them to the database.

FPO database 265 tracks all FPOs 100 with fields such as status, tracking number, date, time, subject, ceiling price, pool date, conditions, and buyer identification number. This database is valuable in the event of disputes between buyers and the intermediary regarding payment, because details of the FPO contract can be produced.

PPO database 267 tracks all PPOs 120 with field such as status, pool date, item ID, PPO tracking number, FPO tracking number, quantity, ceiling price etc. This database is also valuable in the event of disputes between sellers and intermediary as it contains all the details of the PPO contract that can be produced on request.

Sellers bidding database 270 tracks all seller bids 115 with fields such as seller name, seller ID number, date, time, seller bid tracking number, and associated PPO tracking number.

Purchase confirmation database 275 tracks the messages sent to the buyer and seller confirming completed transactions. Fields include buyer name, buyer ID number, seller name, seller ID number, purchase confirmation tracking number, and associated PPO tracking number.

Contract detail database 280 contains form background provisions for inclusion in FPOs 100 and PPOs 110. These form provisions effectively fill the gaps between conditions specified by the buyer, specifying the generic contract details common to most FPOs 100 and PPOs 110.

Payment database 285 tracks all payments made by the buyers with fields such as buyer name, buyer ID number, amount of payment, and associated FPO tracking number. This database may also store credit card or smart card numbers of buyers.

Cryptographic key database 290 facilitates cryptographic functions, storing both symmetric and asymmetric keys. These keys are used by cryptographic processor 210 for encrypting and decrypting FPOs 100, seller bids 115, and purchase confirmations 120.

Audit database 295 stores transactional information relating to the posting of FPOs 100 and PPOs 110, allowing it to be retrieved for later analysis.

Intermediary Account Database 296 tracks all payments made to and by the intermediary. Buyer payments for FPOs 100 may be sent to this account. This account may be a pointer to account data stored at the intermediary's bank.

Buyer account 297 tracks all information pertaining to the buyer's account with fields such as buyer's name, bank and credit account numbers, and debit or credit transactions. This account may be a pointer to account data stored at the buyer's bank.

Seller account 298 tracks all information pertaining to the seller's account with fields such as seller's name, bank and credit account numbers, and debit or credit transactions. Buyer payments for FPOs 100 may be sent to this account.

Escrow account 299 is an account which temporarily holds buyer funds before they are transferred either to the intermediary or the sellers' account 298.

Network interface 245 is the gateway to communicate with buyers and sellers through respective buyer interface 400 and seller interface 300. Conventional internal or external modems may serve as network interface 245. Network interface 245 supports modems at a range of baud rates from 1200 upward, but may combine such inputs into a TI or T3 line if more bandwidth is required. In a preferred embodiment, network interface 245 is connected with the Internet and/or any of the commercial on-line services such as America Online, IBM Global Network, CompuServe, or Prodigy. This allows buyers and sellers access from a wide range of on-line connections. Several commercial electronic mail servers include the above functionality. Microsoft Exchange Server 5.5 is a secure server-based electronic mail software package designed to link people and information over enterprise networks and the Internet. The product utilizes open standards based on Internet protocols. Users can exchange messages with enclosures such as files, graphics, video and audio. Alternatively, network interface 245 may be configured as a voice mail interface, web site, BBS, or electronic mail address.

While the above embodiment describes a single computer acting, as central controller 200, those skilled in the art will realize that the functionality can he distributed over a plurality of computers. In one embodiment, central controller 200 is configured in a distributed architecture, wherein the databases and processors are housed in separate units or locations. Some controllers perform the primary processing functions and contain at a minimum RAM, ROM, and a general processor. Each of these controllers is attached to a WAN hub, which serves as the primary communication link with the other controllers and interface devices. The WAN hub may have minimal processing capability itself, serving primarily as a communications router. Those skilled in the art will appreciate that an almost unlimited number of controllers may be supported. This arrangement yields a more dynamic and flexible system, less prone to catastrophic hardware failures affecting the entire system. The certificate authority embodiment provides more details of such a distributed environment describing operations server 160, certificate authority 165, and settlement server 170. The hardware of these servers would be configured similarly to that described for central controller 200.

Figure 3:
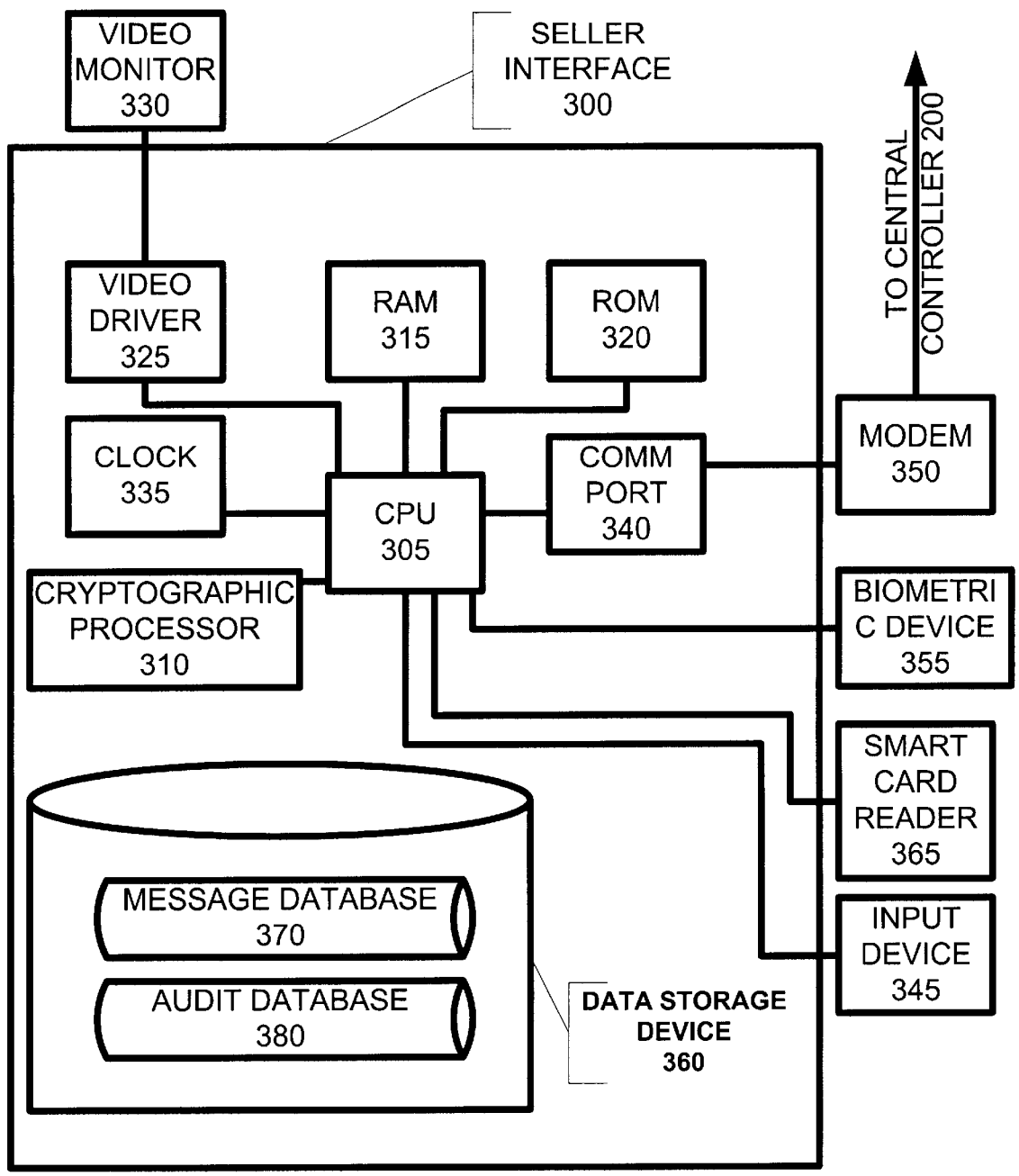
FIG. 3 is a block diagram showing an embodiment of the seller interface.
Figure 4:
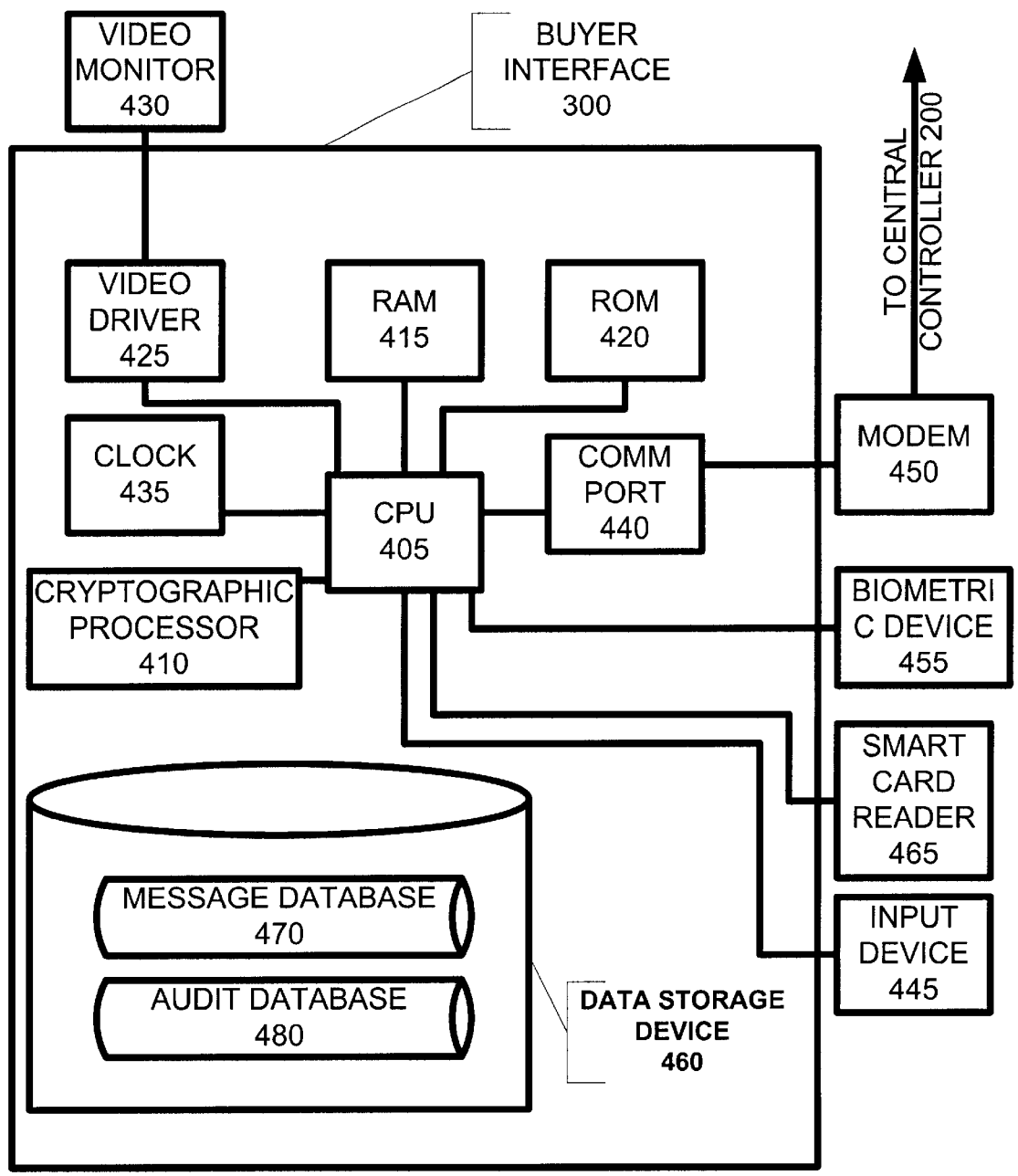
FIG. 4 is a block diagram showing an embodiment of the buyer interface.

FIGS. 3 and 4 describe seller interface 300 and buyer interface 400, respectively. In an exemplary embodiment they are both conventional personal computers having an input device, such as a keyboard, mouse, or conventional voice recognition software package; a display device, such as a video monitor a processing device such as a CPU; and a network interface such as a modem. These devices interface with central controller 200. Alternatively, seller interface 300 and buyer interface 400 may also be voice mail systems, PDAs, or other electronic or voice communications systems. As will be described further in the following embodiments, devices such as fax machines or pagers are also suitable interface devices.

Referring now to FIG. 3, there is described seller interface 300, which includes central processor (CPU) 305, RAM 315, ROM 320, clock 335, video driver 325, video monitor 330, communication port 340, input device 345, modem 350, and data storage device 360. Cryptographic processor310, smart card reader 365 and biometric device 355 may be added for stronger authentication as described later. A microprocessor such as the 450 MHz Pentium II Processor described above may be used for CPU 305. Clock 335 is a standard chip-based clock, which can serve to timestamp seller bid 119 produced with seller interface 300.

Modem 350 may not require high-speed data transfer if most seller responses 110 produced are text-based and not too long. If a cryptographic processor is required, the MC6SHCI6 micro-controller described above is used. The structure of biometric device 355 and smart card reader 365 will be described below in conjunction with the cryptographic authentication embodiment.

Data storage device 360 is a conventional magnetic-based hard disk storage unit such as those manufactured by Conner Peripherals or Maxtor. Message database 370 may be used for archiving seller bids 115, while audit database 380 may be used for recording payment records and communications with central controller 200.

Referring now to FIG. 4, there is described buyer interface 400, which includes central processor (CPU) 405, RAM 415, ROM 420, clock 435, video driver 425, video monitor 430, cryptographic processor 410, smart card reader 4665, biometric device 455, communication port 440, input device 445, modem 450, and data storage device 460. All of these components may be identical to those described in FIG.3.

There are many commercial software applications that can enable the communications required by seller interface 300 or buyer Interface 400 the primary functionality being message creation and transmission. Eudora Pro manufactured by Qualcomm Incorporated, for example, provides editing tools for the creation of messages as well as the communications tools to route the message to the appropriate electronic address. When central controller 200 is configured as a web server, conventional communications software such as the Netscape Navigator web browser, from Netscape Corporation or Internet Explorer, from Microsoft may also be used. The buyer and seller may use these browsers to transmit FPO 100 or seller bids 115. No proprietary software is required.

In a preferred embodiment of the present invention, communications between buyers and sellers take place via electronic networks, with central controller 200 acting as a web server. The buyer logs on to central controller 200, selects the items he wishes to purchase, accepts the maximum price given by the central controller 200 and thereby creates FPO 100, and then disconnects from the network. PPO 110 is then created and made available to potential buyers by posting PPO 110 on the webpage of central controller 200. Periodically, the central controller 200 checks the databases to determine the optimal bid on PPOs 110. Seller bids 115 are transmitted electronically to central controller 200. When the optimal bid has been determined, the central controller contacts the buyer and the seller to indicate that they are mutually bound . Central controller 200 may transfer the intermediary credit card information to the seller as soon as the optimal bid on PPO 110 has been determined.

Figure 5:
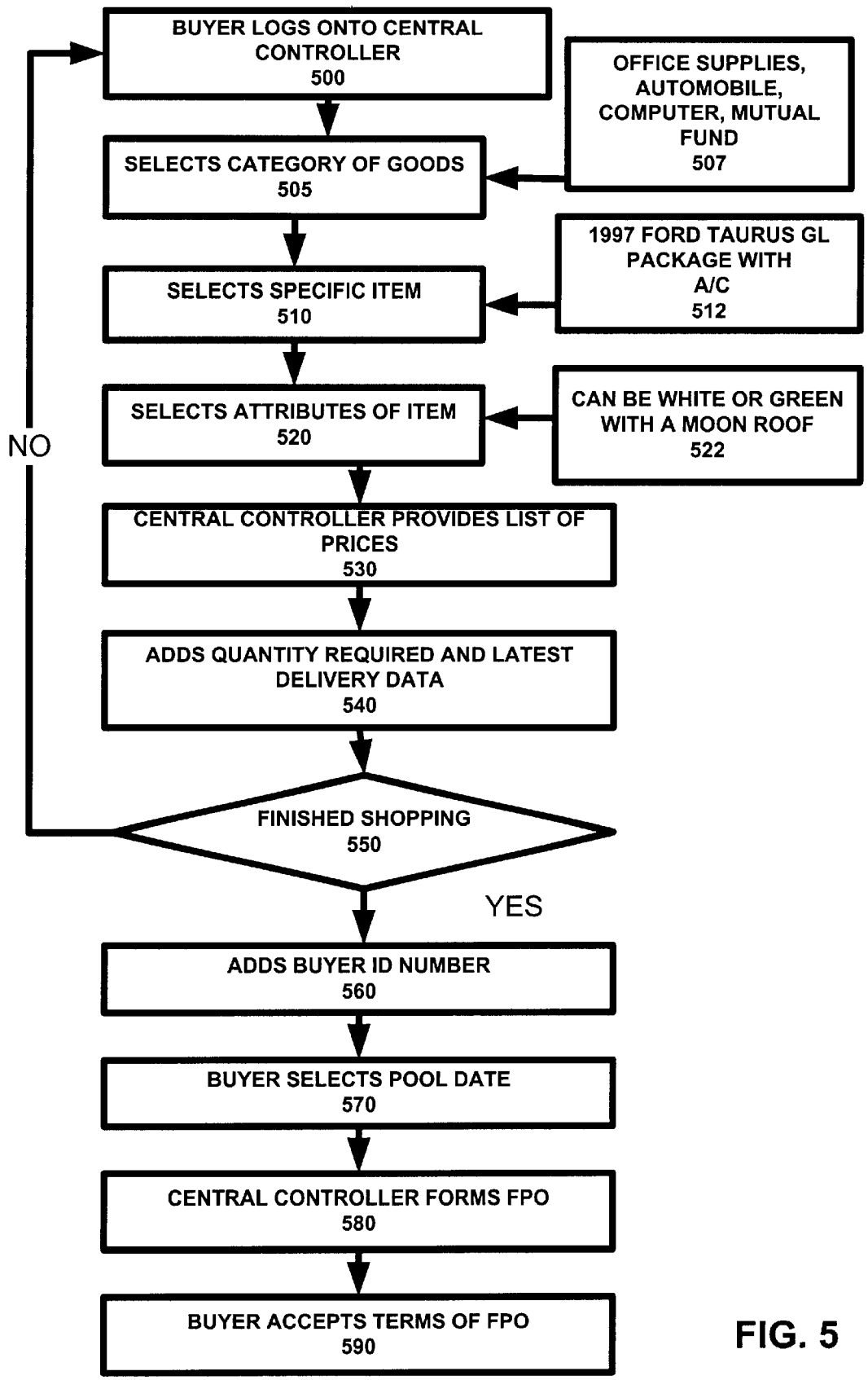
FIG. 5 is an illustrative flow diagram of a buyer presenting a forward purchase order in accordance with an embodiment of the present invention.

With reference to FIG. 5, there is described the process by which the buyer formulates FPO 100. At step 500, the buyer logs on to central controller 200 using buyer modem 450 of buyer interface 400, establishing a communication link. It should be noted that the buyer might be an individual, a corporation, a partnership, government or any other entity. In one embodiment, central controller 200 has a page on the World Wide Web, allowing the buyer to provide information through the interface of conventional web browser software such as Netscape Navigator, manufactured by Netscape, Inc or Internet Explorer, manufactured by Microsoft. At step 505, the buyer selects the category of the goods he wants to purchase by selecting from a list of possible categories. As shown in box 507 categories might include office supplies, automobiles, computers, mutual funds, stocks, airline tickets, hotel rooms, rental cars, insurance, mortgages, clothing, etc. After the category is selected, in step 510 the buyer than selects a particular item from that category. As shown in box 512, this might be a Cross roller pen, 1997 Ford Taurus GL with A/C package, a Dell Dimension XPS R450 Pentium II Processor at 450 MHz, a Fidelity S&P Index fund, IBM stock, a flight from New York to London etc. At step 520 a form is displayed on video monitor 430 of buyer interface 400 (Note steps 505 and 510 could also be accomplished in the same way). This form is an electronic contract with selection fields and/or a number of blanks to be filled out by the buyer, with each blank representing a condition of FPO 100.

At step 520, the buyer enters a description of the goods. A business traveler, for example, might want to fly from first class from New York to London, leaving 10 am May 7 and returning 1pm May 12. There would be selection boxes on the form for originating city, destination city, date and time of departure, date and time of return, number of tickets, class of service, etc. The buyer simply selects his choices from the selection boxes. The buyer then adds other conditions to the blank fields.

Alternatively, the buyer could select two items from the same category, either of which would be satisfactory,. For example he may select the Dell Dimension XPS R450 Pentium II Processor at 450 MHz and Gateway 2000 Inc., GP6-450. These two computers have similar configurations but different manufacturers. The selection of an alternative could later be used to strengthen the buyers leveraging position to obtain an optimum seller bid.

At step 530, the central controller retrieves the pricing of the item from the item database 262 and creates a web page with the buyer selection, a place to indicate quantity and delivery date and the ceiling price and transmits it to the web browser of the buyer. At step 540 the buyer enters the quantity he requires and the delivery date into the appropriate fields. If the buyer has completed shopping he proceeds to step 560 else he can return to step 505 and select the category of his next purchase.

At step 560 the buyer attaches his name or a unique user ID number to FPO 100. This ID number is received from central controller 200 when the buyer registers for the service, or is chosen by the buyer and then registered with central controller 200 by phone. Central controller 200 maintains a database of buyer ID numbers in buyer database 255, and issues (or allows) only unique numbers. If less security is required, the user's telephone number or social security number could serve as the ID number since it has the advantages of being both unique and easily remembered. If additional security is required, those procedures described in the cryptographic embodiment may be implemented.

At step 570, the buyer is presented with a form (similar to method described above) with a selection of pool dates for each category he has selected. The pool dates define the particular day on which sellers will be allowed to place bids on PPOs. Pool dates would take place at regular intervals, typically once a week, but depending on demand could be more or less frequent. At this step the buyer selects the pool date he wishes to participate in. This gives the buyer the opportunity to maximize the effectiveness of pooling his FPO 100 to form a PPO 110. If he selects a pool date with the largest volume of FPOs 100, he is more likely to receive a better bid on the selected item represented by his individual FPO 100. At step 580 the central controller now forms the PPO. At this step, legal language is added to the FPO to form a complete FPO 100. The legal language is pulled from contract detail database 280, which stores a plurality of paragraphs. These paragraphs are linked together with the above contract elements to form a complete FPO 100.

Once the above elements have been developed, the buyer transmits them to central controller 200 at step 590. The buyer does this by clicking on a "send" button located on the screen in which he entered the terms of FPO100.

Instead of a World Wide Web based interface, buyers may also transmit FPO 100 data via other means including electronic mail, PDAs, EDI, voice mail, facsimile, or postal mail transmissions. With voice mail, the buyer calls central controller 200 and leaves FPO 100 in audio form. These FPOs 100 may be transcribed into digital text at central controller 200, or aggregated in multiple formats and made available to potential sellers in the same multiple formats. In a postal mail embodiment, central controller 200 acts more like a aggregator and router, collecting FPOs 100 and forming PPO 110 then directing PPOs 110 to the potential sellers, creating multiple copies of PPO 100 if necessary. PPO 110 may also be posted to bulletin boards or web pages operated by central controller 200. Central controller 200 supports a plurality of transmission methods, allowing for a wide variety of formats of FPOs 100 and PPOs 110. Some formats may be changed, however, before further processing by central controller 200. FPOs 100 transmitted by mail in paper form, for example, may be scanned-in and digitized, using optical character recognition software to create digital text and then used to create PPO 110. These embodiments are more fully described in the off-line embodiment described later.

Figure 6:
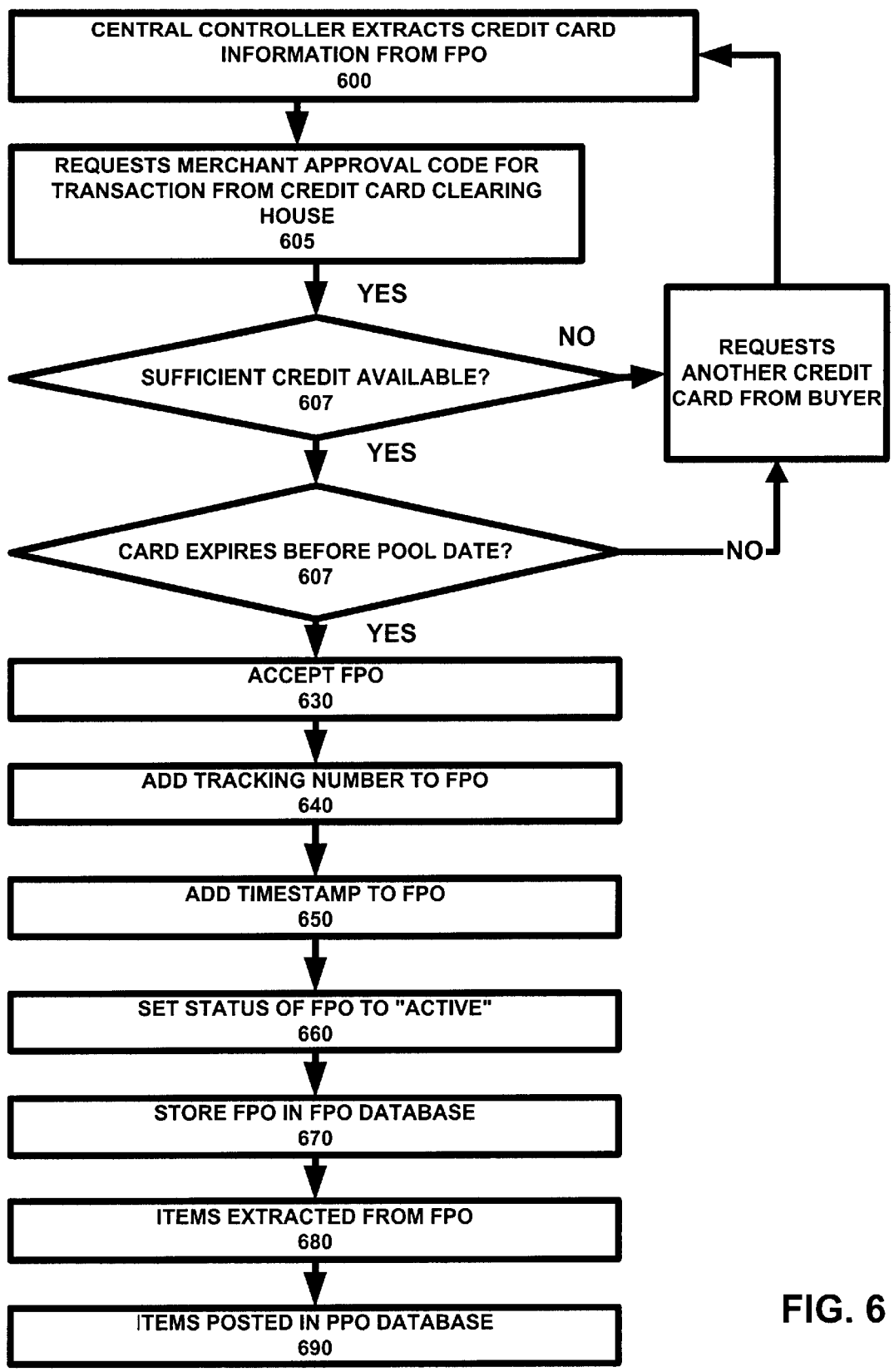
FIG. 6 illustrates the acceptance of a forward purchase order and the creation of a pooled purchase order by the central controller in accordance with an embodiment of the present invention.

Referring now to FIG. 6, FPO 100 is received and checked to see that sufficient credit is available to cover the ceiling price of FPO 100, before FPO 100 is added to PPO 110. At step 600, central controller 200 extracts price and expiration date information from FPO 100. At step 605, payment processor 230 submits a pre-authorization of the total ceiling price of FPO 100 to the credit card clearinghouse. This serves to "lock up" a portion of the available credit on the buyer's credit card, preventing him from using up this credit while FPO 100 is still active. At step 620, the credit card clearinghouse responds to the pre-authorization. Indicating whether sufficient credit is available. If sufficient funds are not available to cover the price of FPO 100, another credit card number is requested from the buyer at step 610. Once an additional credit card number has been transmitted central controller 200 then resubmits the pre-authorization at step 605. At step 620, the expiration date of the credit card is checked to see if it will expire before the pool date. If it will expire another credit card is requested and the pre-authorization process begins again.

If all is well, the FPO is accepted at step 630. At step 640 a unique tacking number is added to the FPO 100. The central controller 200 time-stamps FPO 100 at step 650 sets the status to "active" and stores FPO 100 in the FPO database 265. FPO database 265 contains a record for the FPO 100 and a record for each item in the FPO 100. The FPO record contains fields such as status, tracking number, time-stamp and buyer ID. The status field has values of "pending," "active," "expired,' and "completed." A status of "pending", means that the FPO cannot currently be added into a PPO. Either, central controller 100 is still processing it, or the buyer has temporarily suspended it, or it is part of a multiple step signing key. An "active" FPO 100 is available to be added to a PPO. An "expired" FPO 100 can no longer be used. FPO 100 that have been bid and sold by a seller have a status of "completed." A record for an item of in FPO 100 has fields such item ID, a FPO tracking number, quantity, ceiling price and other conditions added by the buyer.

After being stored at step 670, FPO 100 may go through a series of processing steps. One step, if necessary, is language translation. The system may either create a standard language that all FPO 100s must be written in, or translate them to the a common PPO language. This translation is provided by language experts at central controller 200, or by automatic translation software such as Systran Professional 2.0, manufactured by Systran Software Inc. Fourteen bi-directional language combinations are available, including English to/from French, Italian, German, Spanish, Portuguese, Chinese, Russian and Japanese. Another step, if necessary, is to edit for spelling or grammatical errors. FPO 100 might also be reviewed for clarity. Any FPO 100 with an unclear term or condition would be returned to the buyer for clarification. A buyer adding an unintelligible condition might have FPO 100 returned for clarification or correction.

An example of a pooling process performed by the intermediary (central controller) 200 is now described. Buyer A wishes to purchase two dozen BIC medium point black roller ball pens for a maximum price of $5.00 per dozen. Buyer B wishes to purchase one dozen BIC medium point black roller ball pens for $5.00 per dozen, one dozen BIC medium point blue roller ball pens for $4.00 per dozen and one dozen pencils at $2.00 per dozen. The pooling or aggregation process adds the two FPOs to form a combined PPO 110 of three dozen BIC medium point black roller ball pens at $5.00 per dozen, one dozen BIC medium point blue roller ball pens at $4.00 per dozen and one dozen pencils at $2.00 per dozen. In another embodiment, the PPO 110 would be three dozen BIC medium point black roller ball pens, one dozen BIC medium point blue roller ball pens and one dozen pencils for a maximum price of $21.00.

Referring again to FIG. 7 the items of the FPO 100 are extracted from the FPO 100 at step 680. At step 690 these items are posted to the PPO database 267. The PPO database contains a record for each PPO 110 and a record for each item in the PPO. The PPO record contains fields such as status, tracking number, time-stamp, pool date and category. The status field has values of "pending," "active," "expired,' and "completed." A status of "pending", means that the PPO cannot currently be bid on by a seller. Either, central controller 100 is still processing it, or it has been closed to bidding. An "active" PPO 110 is available to be bid on by potential sellers. An "expired" PPO 110 can no longer be bid on. PPO 110 that have been bid and sold by a seller have a status of "completed." A record for an item of in PPO 110 has fields such item ID, a FPO tracking number, quantity, ceiling price and other conditions added by the buyer.

After being stored at step 690, PPO 110 may go through a language translation step. The system may either create a standard language that all PPO 110s must be displayed in, or translate them to the language most appropriate for the particular seller. This translation is accomplished the same way as described above for FPOs 100. The posting of PPO 110 to the database with appropriate categories allows central controller 200 to display PPO 110 only to the most appropriate sellers. In a World Wide Web environment, central controller 200 has a web page for each possible category. Thus all PPOs 110 requesting office supplies would be displayed on the office supply web page. This makes it much easier for potential sellers to find appropriate PPOs 110 they might want to bid on as they can go right to the category whose goods they can provide. In an alternative embodiment, PPO 110 is electronically mailed to potential sellers, either individually or in groups. Potential sellers could elect to receive all PPOs 110, only those PPOs 110 in their category, or a subset of PPOs 110 representing a particular condition. For example, a printer supplier might request that all printer PPOs 110 for Hewlett Packard printers be sent to them.

In an embodiment in which PPOs 110 are being transmitted to the seller, it is important to note that there are a number of hardware options for seller interface 300. Suitable seller interfaces 300 include fax machines, PDAs with wireless connections, and beepers or pagers. For example, a car dealer could instruct central controller 200 to beep him whenever PPO 110 appeared for his particular make of car, providing details of PPO 110 over the beeper network, or informing the seller to log on to central controller 200 for further details.

Figure 7:
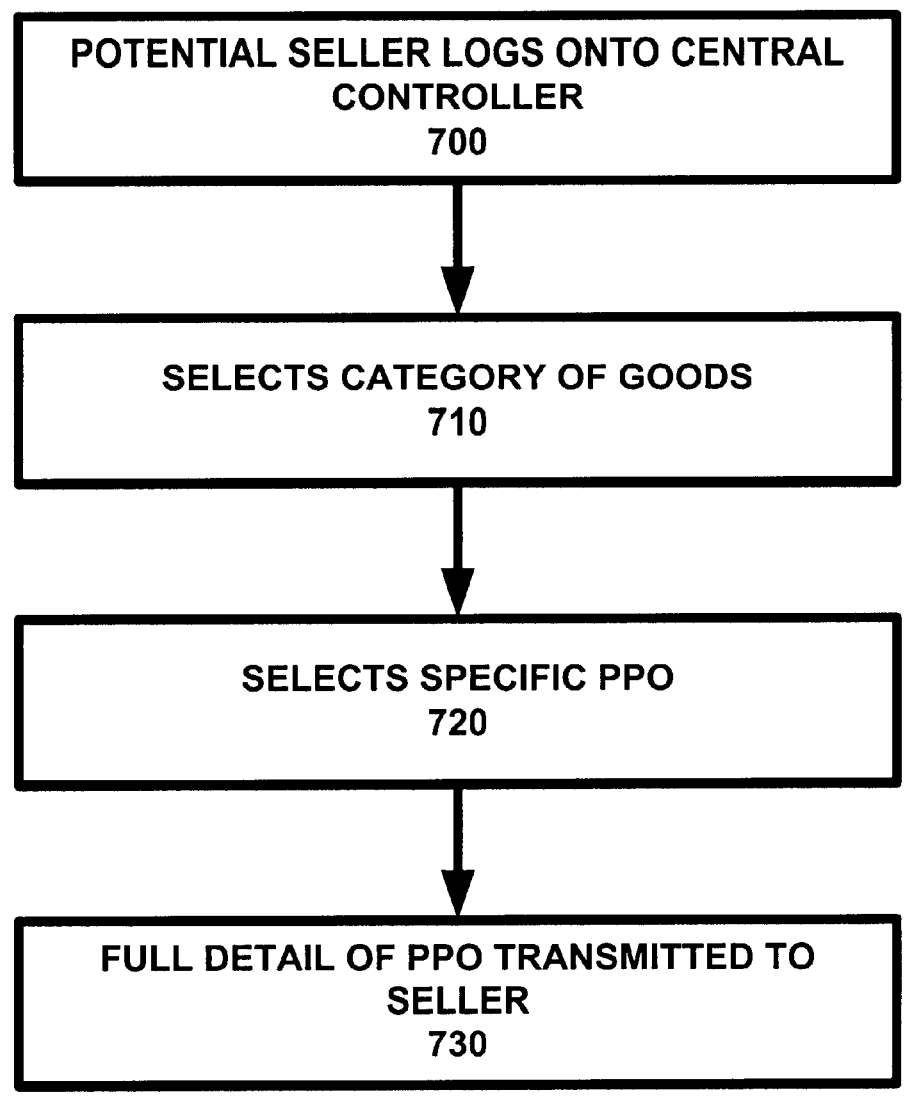
FIGS. 7 and 8 illustrate the seller selection and bidding on a pooled purchase order in accordance with an embodiment of the present invention.

FIG. 7 illustrates the process by which a potential seller selects PPO 110. At step 700 the potential seller logs onto central controller 200 using modem 350 of seller interface 300. At step 710 the potential seller selects an appropriate category. For example, a large office supply chain may have just experienced the cancellation of a very large shipment to a major corporation and might search in the office supply category in the hopes of finding a PPO 110 requesting similar goods. At step 720, the potential seller browses the list of available PPOs 110 (i.e. those with a status of 'active'). PPOs 110 may be listed with minimal details, with additional information available only if the potential seller is interested in bidding on PPOs 110. A potential seller wanting more information about PPO 100 may request additional data at step 730. In one embodiment, each PPO 110 is hyperlinked to a separate web page that provides complete details of the order. The potential seller clicks on PPO 110 and is immediately transferred to the page with additional detail. This detail might include the itemized list of required items and any additional conditions that may be imposed on the purchase. In another embodiment, PPO 110 is electronically transmitted directly to the seller, via EDI, electronic mail, fax, telephone, beeper, etc.

Figure 8:
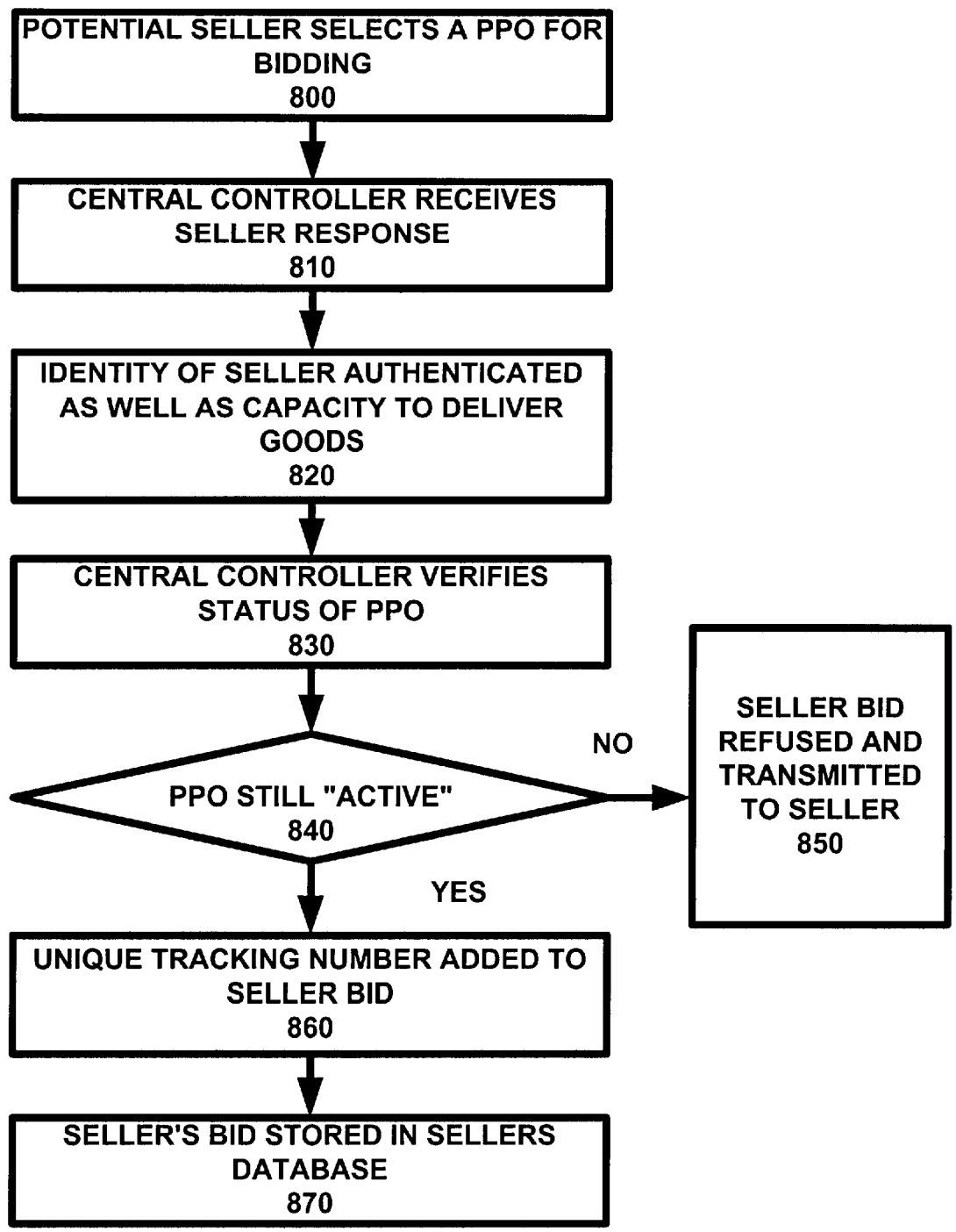

FIG. 8 illustrates the process by which PPO 110 is bid on by a seller. At step 800, the potential seller selects PPO 110, which he would like to bid on, developing seller bid 115, which represents his bid. At step 810 central controller 200 receives seller response 115 from the potential seller. Central controller 200 then time-stamps seller response 115 and authenticates the identity of the seller, as well as verifying his probable capacity to deliver the goods. The time-stamp allows central controller 200 to determine the first bid to be received. In the case of tying bids the deal will be done with the first bid received. If two seller responses 115 are received within a few seconds of each other, the time-stamp allows central controller 200 to decide which was received first. Alternatively, the time-stamp may be appended to seller response 115 at the time it is transmitted from seller interface 300 using clock 335 of seller interface 300. Authentication of the seller's identity involves central controller 200 extracting the seller ID from seller response 115 and looking up the seller's identity in seller database 260. Information in seller database 260 then provides an indication of the seller's ability to deliver the goods. Before a seller can bid on PPO 100 for an office supplies, for example, central controller 200 must authenticate that the seller is an office supply company. If necessary central controller 200 may verify that the seller can provide the specific goods requested. Rather than just verifying that the seller is an office supply company, central controller 200 may verify that it also specializes in gold plated pens.

Central controller 200 then verifies the status of PPO 110 at step 830, determining whether or not the status of PPO 110 is "active" at step 840. If PPO 110 is currently "active" a unique tracking number is added to seller bid 115 at step 860. Central controller 200 then stores seller bid 115 in seller response database 270 at step 870. If the status of PPO 110 is not "active" at step 840, central controller 200 refuses seller bid 115 and transmitted back to the potential seller at step 850.

Figure 9:
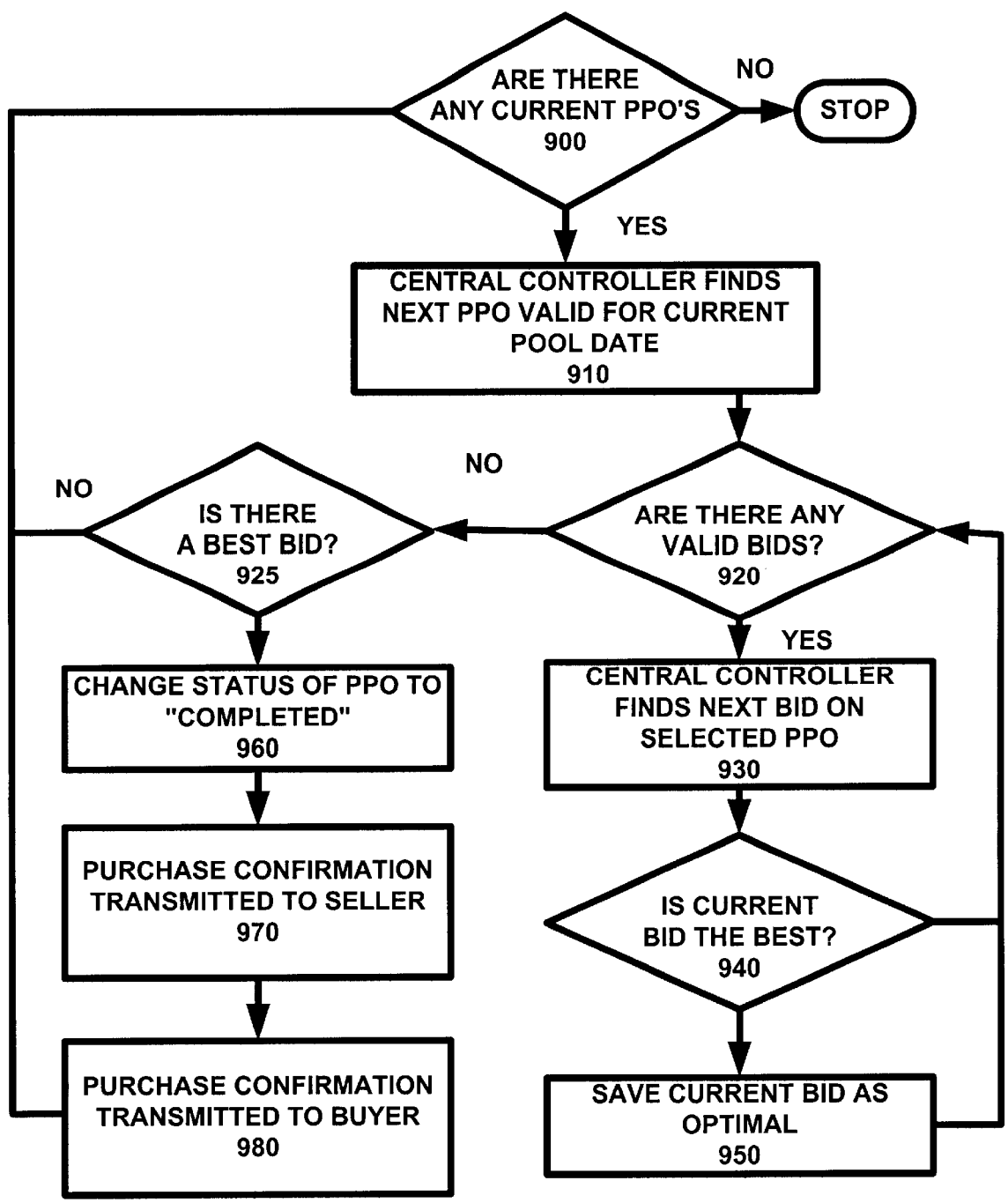
FIG. 9 illustrates the selection of the optimal bid by the central controller on a pool date in accordance with an embodiment of the present invention.

Referring now to FIG. 9, there is illustrated a procedure for the selecting the optimal bid for each PPO 110. At step 900, central controller 200 searches PPO database 267 to see if there are any PPOs 110 with a pooling date that is equal to the current date. If there are none this process is complete and stop at step 905. At step 910, the central controller finds the next (first) PPO 110 with a current pool date. At step 920, the central controller searches the seller bidding database 270 to see if there are any other valid bids on this PPO 110. If there are none, first check to see if there is a current best bid on this PPO. If there are no other valid bids and no current best bid, return to step 900 and start again. If there are bids, find the next (first) bid. At step 940, this bid is compared to the current best bid. If it is not better than the current best bid, return to step 920 and check to see if there are any other valid bids. If it is better than the current best bid, store it as the best bid and return to step 920.

Continuing from step 925, if there was a current optimal bid, at step 960 change the status of the PPO to "Completed". At step 970, a purchase confirmation is sent to the seller and at step 980 a purchase confirmation is sent to the buyer.

In one embodiment, the optimization of the best bid may be found by using an industrial type of optimization software package that uses inventory planning, transportation scheduling, shipping charges, taxes, the cost of the goods etc. One such package is ProfitPro manufactured by Scientific Management Software, Inc.

Figure 10:
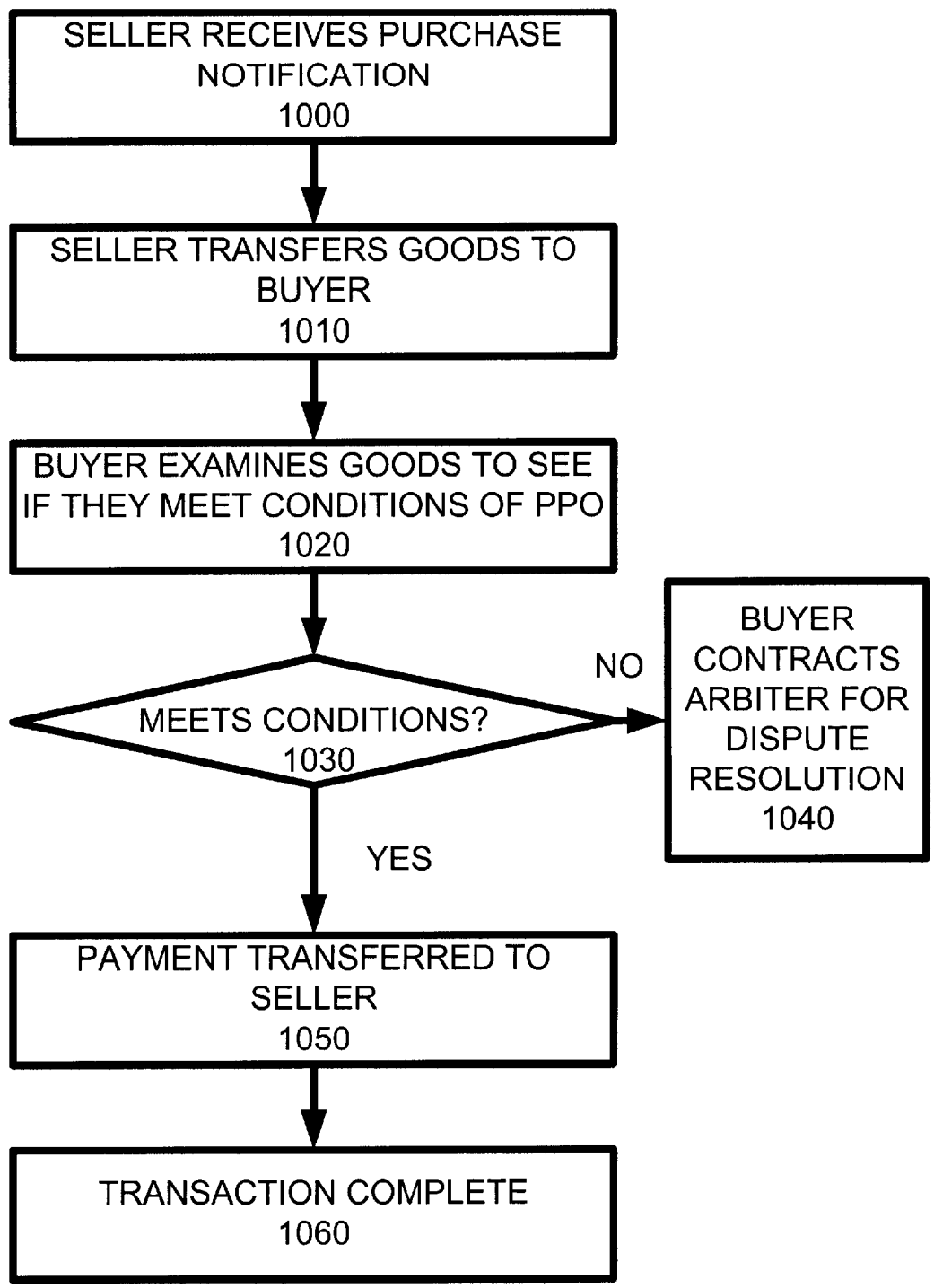
FIG. 10 illustrates an exemplary procedure for exchanging goods and payment between buyer and seller.

FIG. 10 illustrates the exchange of goods between buyer and seller. At step 1000, the seller receives a purchase notification. As mentioned above this could occur in a variety of mechanisms including PDAs, beepers etc. At step 1010, the seller transfers the specified goods to the buyer. This transfer could involve the delivery of physical goods as well as digital goods. Physical goods might include cars, jewelry, computer equipment, etc. digital goods might include documents, computer software, tickets, access codes, etc. A computer manufacturer, for example, might ship a computer to the buyer. At step 1020, the buyer examines the delivered goods to see if they meet all conditions and terms of FPO 100. A buyer purchasing a computer, for example, would verify that the computer had all the correct peripherals and associated software. At step 1040 if the goods do not meet the buyer's conditions as described in FPO 100 the buyer contacts an arbiter at central controller 200 for dispute resolution. This process is described in more detail In the dispute resolution embodiment described later. If the goods meet the conditions, payment is transferred to the seller at step 1050. At step 1060 the transaction is complete.

In one embodiment, the payment made to the seller is achieved by transferring all the credit card information to the seller, and he processes them individually. In another embodiment, the intermediary processes the individual payments of each buyer and pays the seller by another means. These could include credit card, company purchase order, company check or cash etc.

There are many methods by which the providers of the system (the intermediary) could derive a revenue stream. In one embodiment, a flat fee is charged for every FPO 100 submitted. There could also be flat fees that would cover any number of FPOs 100 over a given period of time, allowing buyers to subscribe to the service much as they would subscribe to a newspaper. In another embodiment central controller 200 calculates a commission to add to the best bid on PPO 110 before it is allocated to each individual FPO 100. In another embodiment, advertisers pay to have messages listed along with PPOs 110 or on the catalog selection pages, supplementing the costs of operating the system. Alternatively, the method and apparatus of the present invention may be employed without a payment feature.

Figure 11:
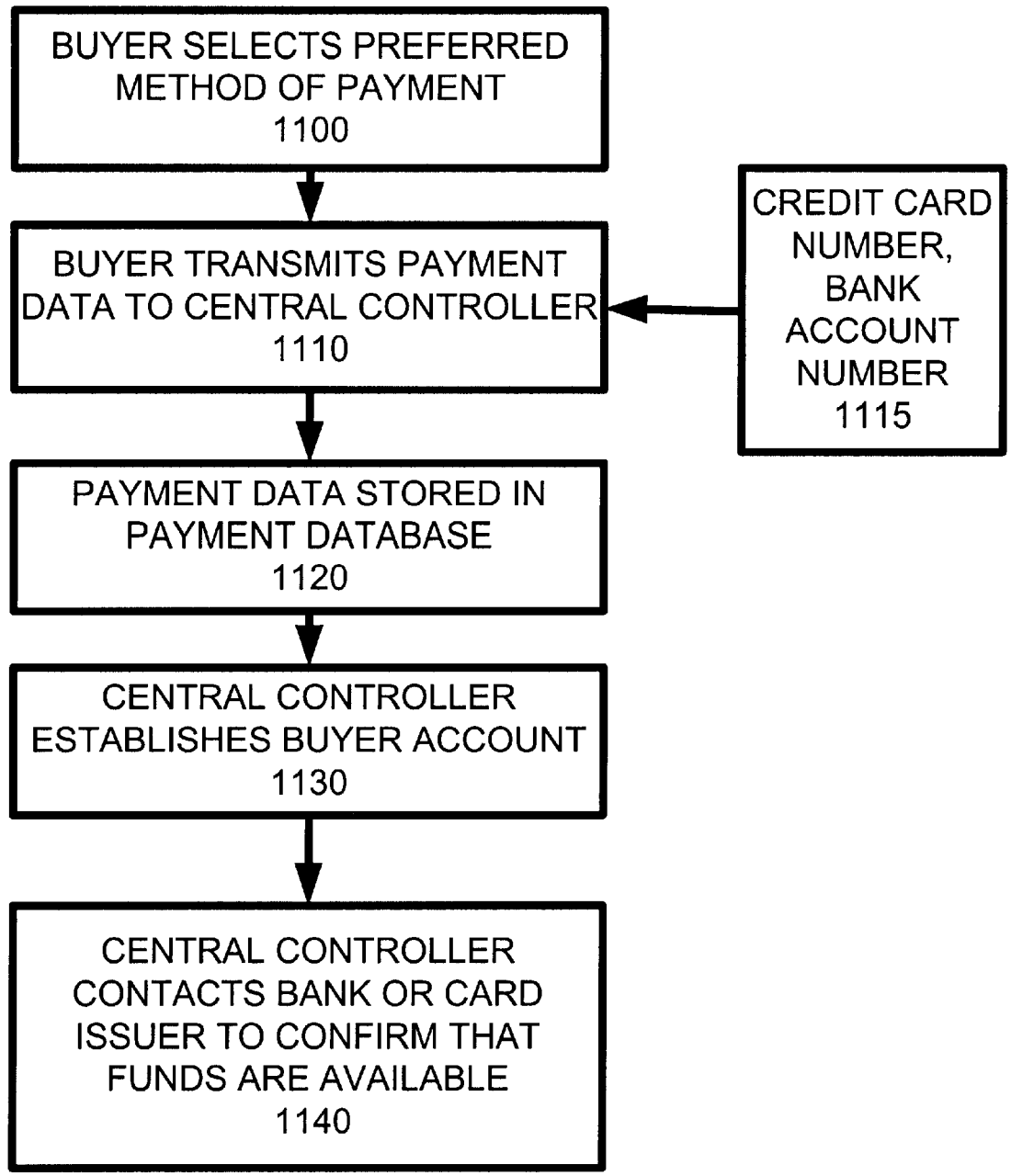
FIG. 11 illustrates an exemplary payment method.

FIG. 11 illustrates a protocol in which central controller 200 establishes buyer account 297. At step 1100, the buyer selects his preferred method of payment. Preferred methods might include credit cards, personal checks, electronic funds transfer, digital money, etc. At step 1110 the buyer transmits payment data corresponding to his preferred method of payment to central controller 200. As indicated by box 1115, such payment data might include credit card number or bank account number. These payment methods are meant to be merely illustrative, however, as there are many equivalent payment methods commonly known in the art, which may also be used. If the buyer wants to pay by credit card, for example, payment data would include his credit card account number, expiration date, name of issuing institution, and credit limit. It should be noted that for some international credit card transactions the beginning date of the credit card need to be used in conjunction with the expiration date to determine if the card is valid. For electronic funds transfer, payment data includes the name of the buyer's bank and his account number. At step 1120, the central controller 200 stores payment data and payment preferences in payment database 285. At step 1130, central controller 200 establishes buyer account 297, which either stores money transferred by the buyer or serves as a pointer to an account of the buyer outside the system. For buyers using credit cards, for example, buyer account 297 contains the credit card number, expiration date and name of issuing institution. Buyers could also transfer money to central controller 200 to be stored in buyer account 297, which would operate like a conventional checking account. Central controller 200 could send a check to the seller written on buyer account 297.

Alternatively, central controller 200 could electronically move the funds directly from buyer account 297 to the intermediary account 296. As noted above there are numerous payment permutations for paying the intermediary and the seller. At step 1140, central controller 200 contacts the bank or card issuer to confirm that funds are available. A buyer is thus unable to use a credit card with no credit available to establish buyer account 297.

The above protocols may be similarly applied to sellers, allowing for the creation of seller account 298. The primary difference being that seller account 298 is primarily used for deposits, with money flowing from seller to buyer in the case of deposit returns or refunds when the buyer does not find the received goods acceptable. Verification of funds available is therefore not as important for sellers.

In the on-line embodiment, central controller 200 performs processing the buyer's credit card. Central controller 200 looks up the credit card number of the buyer in payment database 285. This credit card number is transmitted to payment processor 230. Payment processor 230 contacts the credit card clearinghouse to get an authorization number. The billable amount appears on the credit card statement of the buyer in his monthly statement. The clearinghouse posts this amount to intermediary account 296. Central controller 200 updates payment database 285 to indicate that payment has been made by the buyer.

Another on-line embodiment describes a protocol in which central controller 200 transmits the buyer's credit card information to the seller for processing. Central controller 200 could also arrange for payment to be made directly to the seller account 298 from buyer account 297. Although only two methods are described herein, those skilled in the art will know that there are of course many payment protocols under which payment may be transferred from buyer to intermediary, to seller.

Another method of payment involves procedures using digital cash. Central controller 200 looks up the buyer's electronic delivery address in payment database 215. This address is transmitted to payment processor 230, with the digital cash being downloaded from the buyer. Central controller 200 updates payment database 285 to indicate that payment has been made by the buyer. This address might be an electronic mail address if the digital cash is to he transferred by electronic mail, or it could be an Internet protocol address capable of accepting an on-line transfer of digital cash. This electronic delivery address is sent to payment processor 230. The digital cash is downloaded to intermediary account 298 or directly to the seller account 298 or directly to seller. Central controller 200 then updates payment database 285 to indicate that payment has been made. Using these digital cash protocols, it is possible for the buyer to include payment along with FPO 100 in electronic form.

In yet another embodiment, the procedure of using digital cash could include the use of smart cards. An example of such a device is the SmartPortDT manufactured by Tritheim Technologies, Inc. The SmartPortDT is an intelligent desktop smart card reader/writer designed for electronic commerce, network and Internet security and software copy protection. The SmartPortDT is fully Compliant with ISO 7816 T=0, T=1, T=14, PC/SC and Mondex standards. These cards are currently being used by several electronic payment systems, such as Mondex and Visa cash. The practice of using digital cash protocols to effect payment is well known in the art and need not be described here in detail. For reference, one of ordinary skill in the art may refer to Daniel C. Lynch and Leslie Lundquist, Digital Money, John Wiley & Sons, 1996: or Peter Wayner, Digital Cash: Commerce on the Net, Academic Press, 1996.

Although the on-line embodiment describes a protocol in which sellers receive payment immediately upon delivery of the goods. Other embodiments may be implemented in which payment is delayed until some predetermined date. Partial payments and installment payments are also supported by the system.

Escrow account 299 allows payment to be delayed until the seller completes delivery of the goods, while at the same time ensuring that the buyer will in fact make payment. Central controller 200 establishes escrow account 299 as a temporary holding account. When the seller is awarded PPO 100 funds are transferred from buyer account 297 to escrow account 299. Only after the buyer has received the goods are funds transferred from escrow account 299 to intermediary account 296. The buyer may transmit a digitally signed release message to central controller 200, authorizing the release of the escrowed funds to the seller.

In another embodiment, the buyer makes a partial payment when PPO 110 is awarded, and then completes payment when the goods ore received. The fraction of the bid price of PPO 110 to be paid upon award of the best bid is stored in payment database 285 when FPO 100 is created. Central controller releases this portion of the funds to the seller, and then releases the remaining portion after goods have been delivered. The partial payment made upon award of the best bid may be non-refundable. This would allow a travel agent, for example, to sell vacation package reservations to a group of people with the proviso that the reservations that are cancelable on two days notice, with cancellations within the two day period resulting in forfeiture of deposit.

In yet another embodiment, FPO 100 and PPO 110 describe the use of installment payments. The first payment is made when PPO 110 is awarded, followed by regular payments as specified in the conditions of FPO 100 and PPO 110. The dates at which payments are to be made are stored in payment database 285.

In an off-line embodiment of the present invention, buyers, the intermediary and sellers communicate by using a telephone, fax machine, postal mail, or other off-line communication tools.

A buyer may use a telephone, for example, to generate FPO 100. The buyer calls central controller 200 and is connected with an agent. The buyer provides the items of FPO 100 such as category, description of goods, quantity, pool date, etc. The buyer also provides his buyer ID, password, or private key so that central controller 200 can authenticate his identity. The agent puts this data into digital form by typing it into a terminal. The agent then provides the buyer with the ceiling price for each item. Once the buyer accepts the ceiling price, the agent then adds legal language to form FPO 100. FPO 100 is then transmitted to central controller 200 where it is converted into PPO 110 as described in the on-line embodiment.

In an alternative embodiment, the buyer calls central controller 200 and is connected with a conventional Interactive Voice Response Unit (IVRU) which allows the buyer to enter some or all of the terms of FPO 100 without the assistance of a live agent. The buyer initially selects from a menu of categories with the touch-tone keys of his phone. The specific items can also be selected in the same manner. The central controller can then announce the ceiling price for each item and the buyer can then use his touch-tone keys to select the quantity required. This information can then be used to generate PPOs 110.

Potential sellers may also use a telephone to browse and bid on PPOs 110. The potential seller calls central controller 200 and selects a category. Central controller 200 then converts the list of each PPO 110 into audio format reading the entire list to the potential seller. At any time during the reading of PPOs 110, the potential seller may press a combination of keys on his telephone to select PPO 110 for bidding. The central controller could then convert the itemized list of items on the PPO 110 to audio format. on completion, the seller enters seller ID number and is authenticated by central controller 200 prior to his bidding of PPO 110. He could then use the keys on his phone to enter his bid. Potential sellers could also enter parameters before having the list of PPOs 100 read to them. A computer manufacturer, for example, might request that all computer PPOs 110 for more than eight hundred units be read, skipping any PPO 110 with a lower count.

Buyers may also communicate with an agent at central controller 200 through faxes or postal mail. The agent receives the message and proceeds to digitize it and form FPO 100 and PPO 110 as described above.

In the previous embodiments, authentication of the buyer and seller involves checking the attached ID or name and comparing it with those stored in seller database 260 and buyer database 255. Although this procedure works well in a low security environment, it can be significantly improved through the use of cryptographic protocols. These protocols not only enhance the ability to authenticate the sender of message but also serve to verify the integrity of the message itself, proving that it has not been altered during transmission. A small computer manufacturer, for example, could be prevented from, bidding on PPOs 110 requiring delivery of thousands of computers, as their identity would not be authenticated for a transaction requiring the performance of a larger manufacturer. Encryption can also prevent eavesdroppers from learning the contents of the message. A competing manufacturer, for example, could be prevented from reading any intercepted seller bid 115 generated by another competitor. Such techniques shall be referred to generally as cryptographic assurance methods and will include the use of both symmetric ad asymmetric keys as well as digital signatures and hash algorithms.

The practice of using cryptographic protocols to ensure the authenticity of senders as well as the integrity of messages is well known in the art and need not be described here in detail. For reference, see Bruce Schneier, Applied Cryptography, Protocols, Algorithms, And Source Code in C. (2nd Ed, John Wiley & Sons Inc., 1996).

Figure 12:
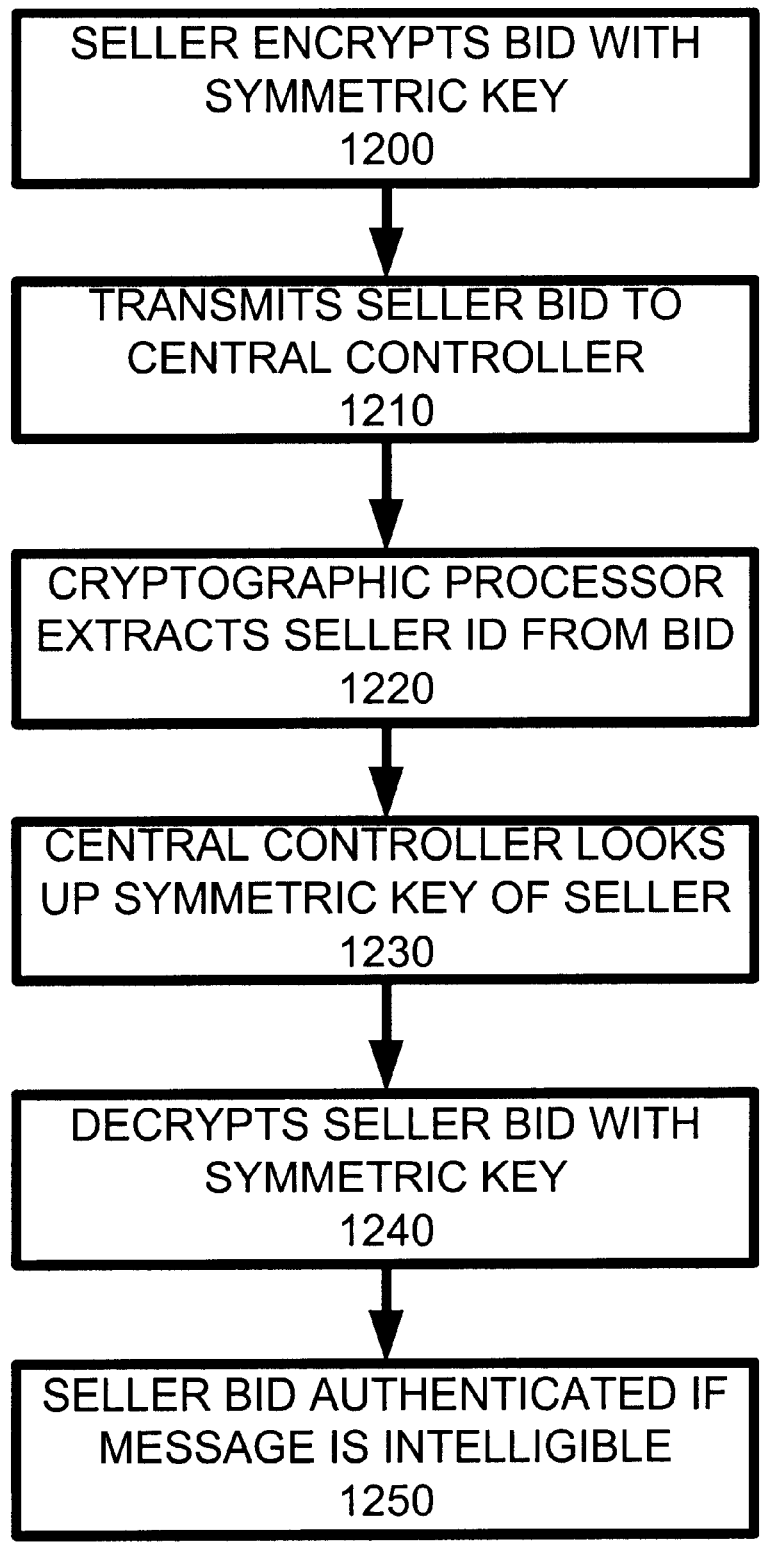
FIGS. 12 through 15 illustrate an exemplary authentication procedure using cryptographic protocols.

FIG. 12 describes a symmetric key embodiment in which the seller and central controller 200 share a key. Thus both encryption and decryption of seller bid 115 are performed with the same key. This encryption may be implemented with an algorithm such as DES (U.S. Government standard, specified in FIPS 46, published in November 1976), or with any of several algorithms known in the art such as Triple DES, IDEA, Blowfish, RC4, RC2, CAST, etc. The seller encrypts seller bid 115 with his assigned symmetric key at step 1200 using cryptographic processor 310 of seller Interface 300. The key may be stored in message database 370 or otherwise noted or memorized by the seller. The encrypted seller bid 115 is then transmitted to cryptographic processor 210 of central controller 200 at step 1210. Cryptographic processor 210 extracts the seller ID from seller bid 115 at step 1220 and looks up the symmetric key of the seller in cryptographic key database 290 at step 1230, decrypting seller bid 115 with this key at step 1240. Cryptographic key database 290 contains algorithms and keys for encrypting, decrypting and/or authenticating messages. At step 1250, if the resulting message is intelligible, then the same key must have encrypted it. Authenticating that the seller must have indeed been the author of seller bid 115.

This procedure makes it significantly more difficult for an unauthorized seller to represent himself as a legitimate seller. Without cryptographic procedures, an unauthorized seller who obtained a sample seller bid 115 from a legitimate seller would be able to extract the seller ID and then attach this ID number to unauthorized seller bids 115. When seller bid 115 has been encrypted with a symmetric key, however, an unauthorized seller obtaining a sample seller bid 115 only discovers the seller's ID number, not the symmetric key. Without this key, the unauthorized seller cannot create a seller bid 115 that will not be discovered by central controller 200, since he cannot encrypt his message in the same way that the authorized seller could. The symmetric key protocol also ensures that seller bid 115 has not been tampered with during transmission, since alteration of the message requires knowledge of the symmetric key. An encrypted seller bid 115 also provides the seller with more anonymity.

Figure 13:
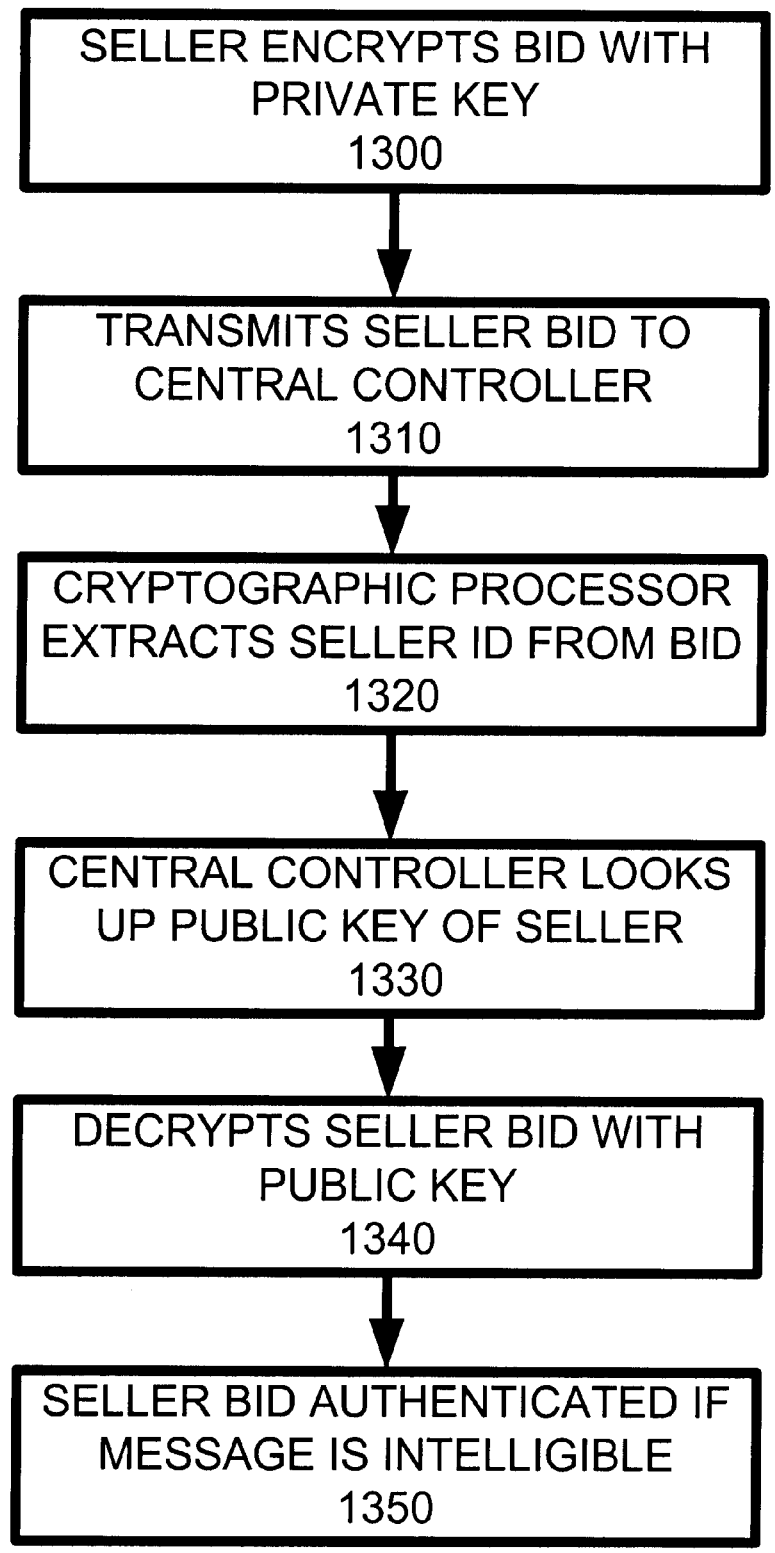

Referring now to FIG. 13, there is shown an asymmetric key protocol in which seller bid 115 is encrypted with a private key and decrypted with a public key. Two such algorithms for this procedure are RSA and DSA. At step 1300, the seller encrypts seller bid 115 with his private key using cryptographic processor 310, transmitting seller bid 115 to central controller 200 at step 1310. Cryptographic processor 210 extracts the seller ID at step 1320 and looks up the seller's associated public key in cryptographic key database 290 at step 1330, decrypting seller bid 115 with this public key at step 1340. As before, if seller bid 115 is intelligible then central controller 200 has authenticated the seller at step 1350. Again, unauthorized sellers obtaining seller bids 115 before central controller 200 received it are not able to undetectably alter it since they do not know the private key of the seller. Unauthorized sellers would, however, be able to read the message. If they managed to obtain the public key of the seller. Message secrecy is obtained if the seller encrypts seller bids 115 with his public key requiring the attacker to know the seller's private key to view seller bid 115.

Figure 14:
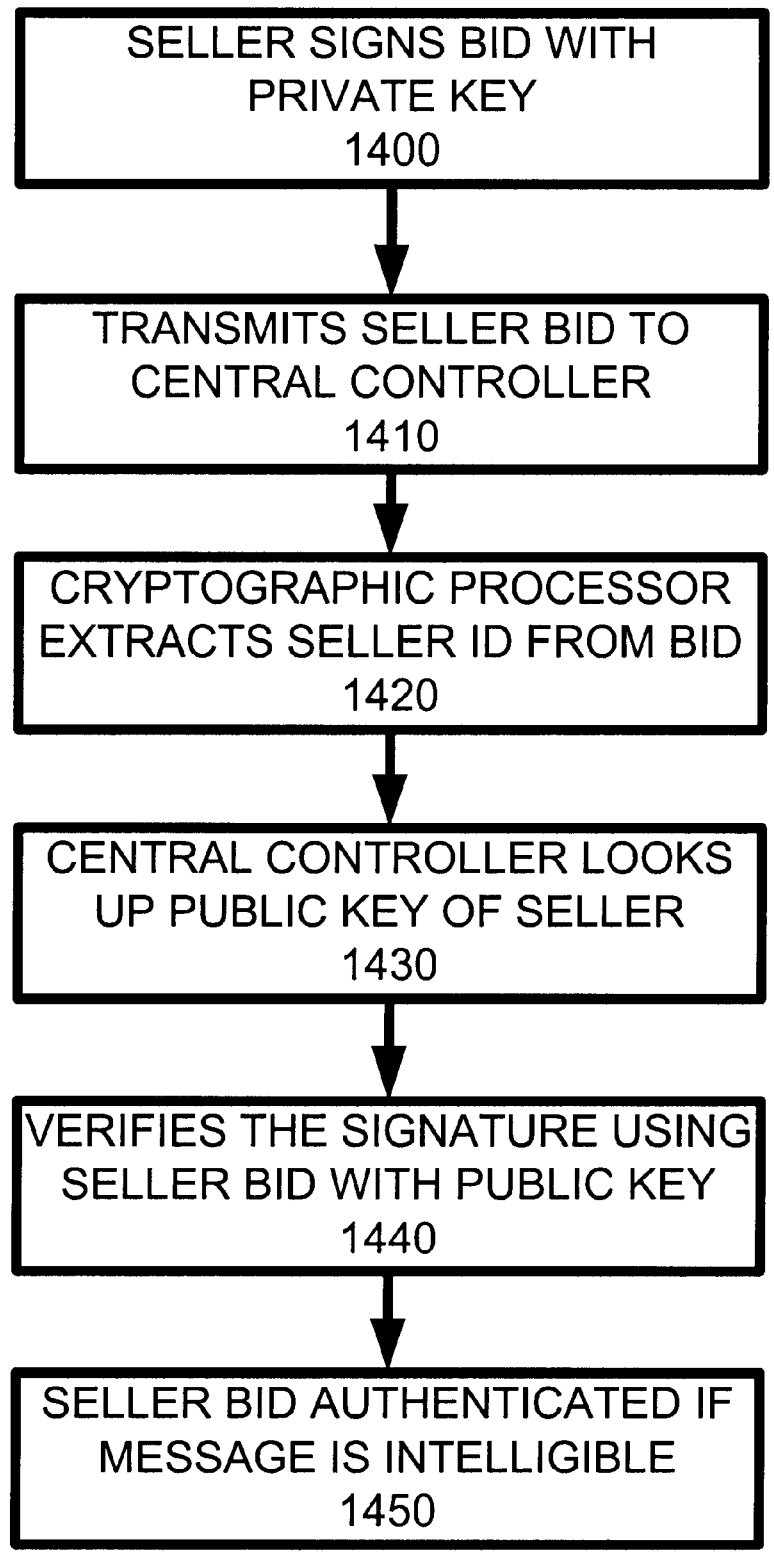

FIG. 14 shows a cryptographic technique using digital signatures to provide authentication and message integrity. One such algorithm is DSA (Digital Signature Algorithm) uses U.S. Government standard specified in FIPS PUB 186. As in the asymmetric protocol described above each seller has an associated public and private key. The seller signs seller bid 115 with his private key at step 1400 with cryptographic processor 310 and transmits it to central controller 200 at step 1410. Central controller cryptographic processor 210 extracts she seller ID at step 1420 and looks up the seller's public key at step 1430 verifying the signature using seller bid 115 and the public key of the seller at step 1440. If seller bid 115 is intelligible, then central controller 200 accepts seller bid 115 as authentic at step 1450.

Figure 15:
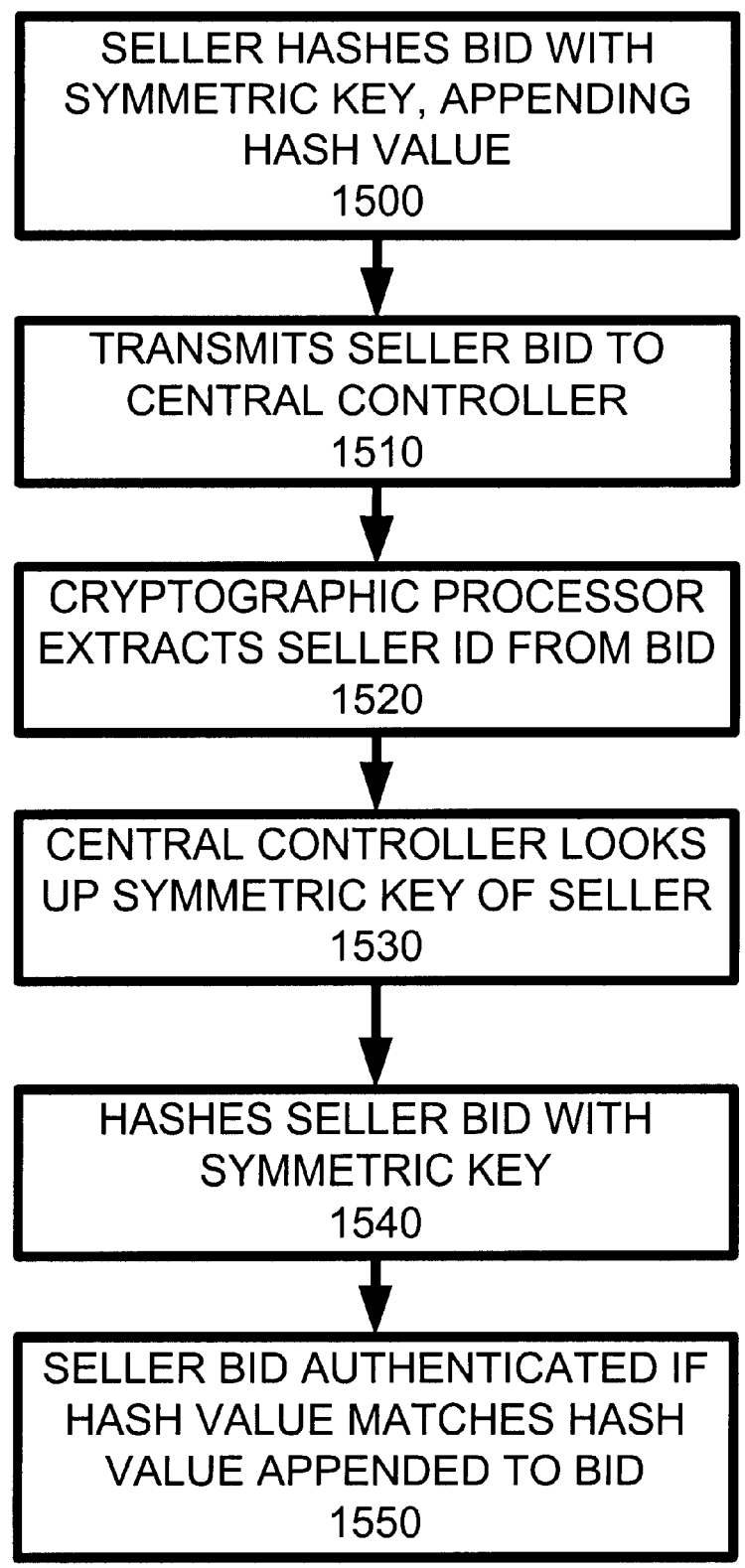

Referring now to FIG. 15, there is described a cryptographic technique using message authentication codes for verifying the authenticity and integrity of seller bid 115. In the hash protocol of the present invention, the seller and central controller 200 share a symmetric key, which the seller includes in a hash of seller bid 115, at step 1500. In the hash protocol, a one-way function is applied to the digital representation of seller bid 115, generating a code that acts much like the fingerprint of seller bid 115. Any of the MD algorithms, such as RIPEMD-160, MD5, SHA-1, MDC-2, MDC-4 and the like may be applied In this application. After transmitting seller bid 115 to central controller 200 at step 1510, cryptographic processor 210 extracts seller ID from seller bid 115 at step 1520. Then cryptographic processor 210 looks up the seller's symmetric key at step 1530 and hashes seller bid 115 with this symmetric key at step 1540, comparing the resulting hash value with the hash value attached to seller bid 115. If the values match at step 1550, the integrity of seller bid 115 is verified along with the authenticity of the seller.

Although cryptographic techniques can provide greater confidence in the authenticity of seller bids 110, they are useless if the seller's cryptographic keys are compromised. An attacker obtaining the symmetric key of another seller is indistinguishable from that seller in the eyes of central controller 200. There is no way to know whether the seller was the true author of seller bid 115, or an attacker with he right cryptographic keys. One way to solve this problem (known as undetected substitution) is to use biometric devices such as a fingerprint reader, voice recognition system, retinal scanner and the like. These devices incorporate a physical attribute of the seller into seller bid 115, which is then compared with the value stored in seller database 260 at central controller 200. In the present invention, such devices attach to seller interface 300.

Fingerprint verification, for example, may be executed in several forms. (a) before the creation of seller bid 115, (b) during the generation of seller bid 115 in response to prompts from central controller 200, (c) at some predetermined or random times, or (d) continuously by incorporating the scanning lens into seller interface 300 such that the seller is required to maintain his finger on the scanning lens at all times for continuous verification while seller bid 115 is generated.

An example of such an identification device is the FingerCheck FC200 available from Startek, a Taiwanese company. The FC200 is readily adaptable to any PC via an interface card and is about the size of a computer mouse. The fingerprint verifier utilizes an optical scanning lens. The seller place his finger on the lens and the resulting image is scanned, digitized, and the data compressed and stored in memory. Typically, a 256-byte file is all that is required. Each live-scan fingerprint is compared against the previously enrolled/stored template, stored in data storage device 360. If the prints do not match cryptographic algorithms executed by cryptographic processor 335 may prevent the seller from generating a bid 115.

In a voice verification embodiment, the seller's voice is used to verify his identity, This embodiment has the advantage of not requiring the use of any specialized hardware since it can be implemented over a standard phone connection. The seller's identity is verified at central computer 200. The process of obtaining a voiceprint and subsequently using it to verify a person's identity is well known in the art and therefore need not he described in detail herein. One of ordinary skill in the art may refer to SpeakEZ, Inc. for voice identification/verification technology. Conventional speaker identification software samples the seller's voice. This sample is stored at central controller 200 in seller database 260. Each time the seller wants to transmit seller response 110 to central controller 200, he is required to call central controller 200 and speak into the phone at the prompt for a voice sample. If this sample matches that stored in seller database 260, the seller is provided a password which is incorporated into the digital signature appended to seller bid 115. Any seller bid 115 received without appropriate voice match password is not accepted. The voiceprint may also be stored in a database within data storage device 360 of seller interface 300, to verify seller's identity locally prior to allowing seller bid 115 to be created.

Another method of authentication and identification is the use of smart cards 365 attached to sellers interface 300. An example of such a device is the SmartPortDT manufactured by Tritheim Technologies, Inc. The SmartPortDT is an intelligent desktop smart card reader/writer designed for electronic commerce, network and Internet security and software copy protection. The SmartPortDT is fully Compliant with ISO 7816 T=0, T=1, T=14, PC/SC and Mondex standards. In this embodiment, the intermediary provides each potential seller with a smart card. Embedded on the smart card is the seller ID and a second private key for the seller, which would remain unknown to the seller. In this protocol unauthorized sellers would have to have knowledge of the seller's keys (symmetric, asymmetric or hash function) and would have to be in possession of the seller's smart card. This technique could also be augmented with biometric devices.

In another embodiment, sellers could be provided with a hardware device used for authentication. These devices are usually called tokens. Two common tokens are made by Security Dynamics and by Axent. The Security Dynamics SecurID card has a window on the front, which displays a cryptographically generated random number, which changes once a minute. The matching authentication server, central controller 200, can duplicate the computation to verify the number. The seller simply copies the number from the card along with his seller ID in sellers bid 115. The Axent Defender card is a small calculator device with a key pad and a display. In operation, the central controller 200 sends the seller a challenge code, which is entered into the card along with the sellers ID. The seller transmits the response code to central controller 200. Central controller 200 executes the same computation and compares the result.

Although the above cryptographic and biometric protocols describe the authentication and validation of seller bids 115, they may be equally applied to the authentication and validation of FPO 100, purchase confirmation 120, or any at message or communication between buyers, sellers, and central controller 200.

Currently there are two encryption protocols that are standard components of Internet browsers. These are available in such browsers as Netscape Navigator and Microsoft Internet Explorer. These protocols are the Secure Socket Layer (SSL) and the Secure Electronic Transaction (SET). In one embodiment, these techniques could also be used to achieve some of the cryptographic requirements mentioned above.

As mentioned previously, the present invention provides for the anonymity of both buyers and sellers. Such anonymity is accomplished by eliminating all references to names of the individuals for all transactions. The process of creating PPO 110 from FPO 100 ensures that the seller need not be notified of the buyers' identities. Also buyers are prevented from seeing other buyers FPO 100 and so their identities are kept from other members of the pool. In this embodiment, the payment protocol of buyers paying the intermediary and then the intermediary paying the seller ensure complete anonymity for both buyer and seller. This is desirable if the buyer were an individual who did not want to be inundated with direct mail solicitations usually generated from the purchase of certain item.

Another advantage afforded to buyers is the ability to provide them with a confidential shield from credit card companies and others who are trying to ascertain their buying habits and preferences. If the buyer buys through an intermediary, and then has the goods shipped through a third party, it is possible for them to maintain complete confidentiality in their purchases.

In a similar manner, sellers may also want to keep their identity a secret. A grocery retail chain might not want the public to know that they are heavily discounting certain canned goods for bulk resale.

Although using ID numbers can provide anonymity, both for buyers and sellers, there are a number of potential weaknesses. First, if the database of ID numbers stored in buyer database 255 or seller database 260, and the intermediary is compromised, anonymity is destroyed since the message sender can be looked up in buyer database 255 or seller database 260. To prevent this, the ID numbers are encrypted with the public key of central controller 200, so that even if it is stolen it is useless without the private key.

Although we have described only one possible method for maintaining anonymity there are other equivalents. For example, if the embodiment included telephone messaging, the identity of the buyer and seller could be maintained using conventional voice modification techniques. If FPO 100 or seller bids 115 were in a paper for, the form could be scanned using optical character recognition and translated into digital form, discarding any information that could be found in the original document.

Figure 16:
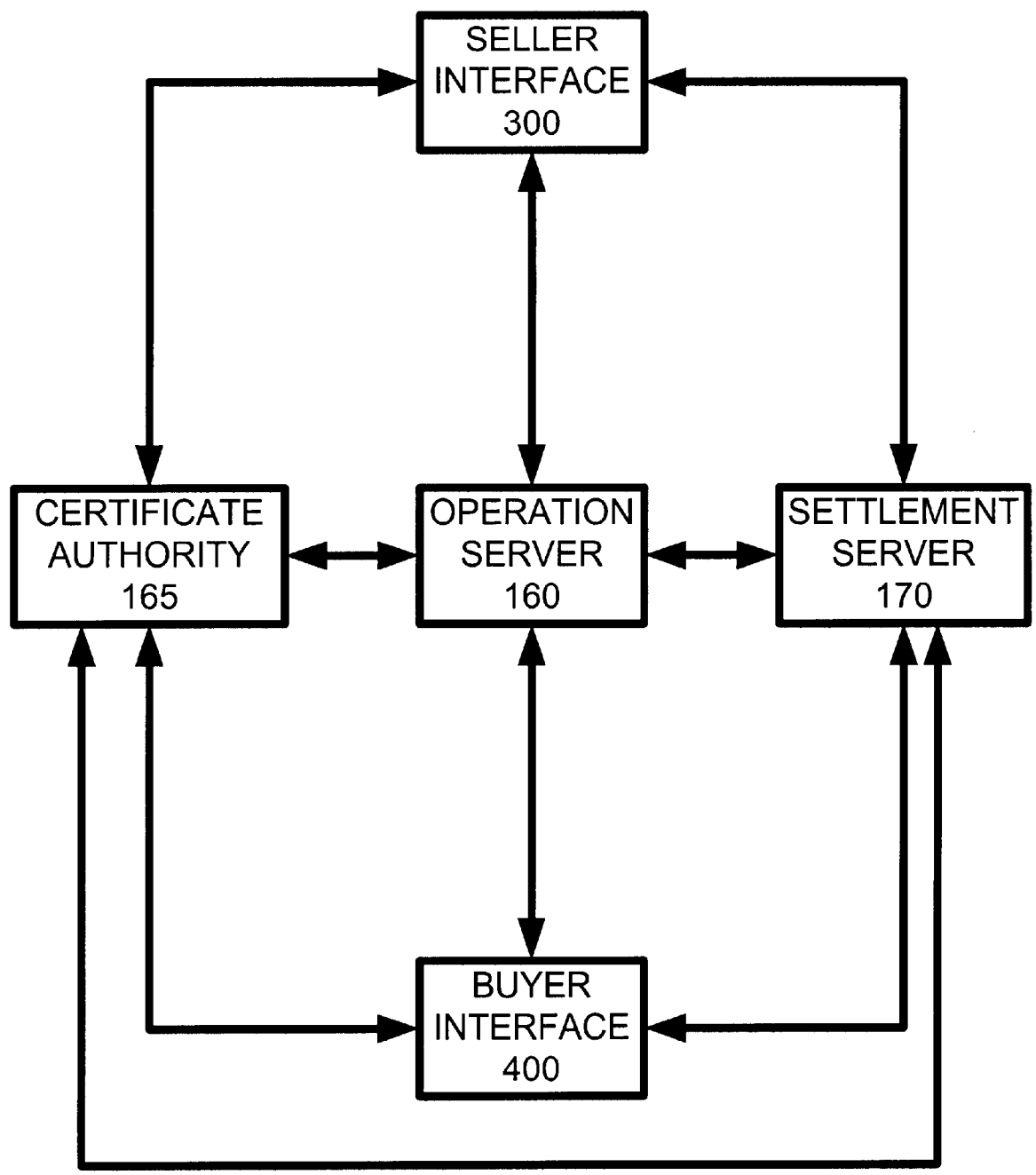
FIG. 16 illustrates an embodiment showing the use of a certificate authority and a settlement server.

In one embodiment of the present invention, central controller 200 is separated into three distinct elements: operations server 160, certificate authority 165, and settlement server 170. Each server performs a distinct task in the process of managing FPO 100 and seller bids 115. This separation makes it more difficult for attackers to compromise the system, as they must defeat the security of three separate systems, instead of one. As indicated in FIG. 16, these servers work in conjunction with buyer interface 400 and seller interface 300. Operations server 160 has the task of posting FPOs 100, PPOs 110 and receiving buyers bids 115 and accepts all transactions previously authenticated by certificate authority 165. Certificate authority 165 authenticates the identity of buyers and sellers while settlement server 170 verifies the ability of buyers to pay and the ability of sellers to deliver on FPOs 100 and seller bids 115. In this embodiment, each server type may be distributed over a number of servers.

There are two types of certificate authorities. The first is an internal server and the second is a trusted third party. This third party could also be the settlement server as well. For example, banks, insurance companies and other financial institutions could issue digital certificates establishing the identity of an individual and convey other pertinent information such as the individual's authority to represent an organization and his spending limit. Similarly they could also certify the individual's ability to pay or deliver goods much as they do now when they issue letters of credit. These third parties have the financial capability to back up their certifications and thus can insure both buyers and sellers against fraud.

An example of such a system is the CertAuthority Solution manufactured by CertCo LLC. This system also comes with an optional temper evident hardware based private key that is easy to transport and store securely. An example of a settlement server is the Integrated Commerce Service manufactured by Open Market Inc. It provides back-office services necessary to run Web-based businesses. Services include on-line account statements, order-taking and credit card payment authorization, credit card settlement, automated sales tax calculations, digital receipt generation, account-based purchase tracking, and payment aggregation for low-priced services.

The practice of using certificate authorities and settlement servers is well known in the art and need not be described here in detail. For reference, one of ordinary skill in the art may refer to Winfield Treese and Lawrence Stewart, Designing Systems for Internet Commerce, Addison Wesley, 1998.

This set of protocols describes one possible implementation of an infrastructure to support FPO100, PPO110, and sellers bid 115. It is important to note that operations server 160, certificate authority 165 and settlement server 170 can conceivably be the same entity. In this case the protocols are somewhat simplified, but can still be achieved using the same software mentioned above.

In one embodiment of the present invention, there may be a requirement that multiple individuals from a single buyer sign a FPO 100. This is a common occurrence at many companies where at least 2 people have to sign a purchase order before it is valid. The present invention allows for multiple signers, by using a cryptographic technology called key fragmentation. In this embodiment, each individual at the buyer is assigned a specific fragment of the private key. An example of such a mechanism is the Multi-Step Signing manufactured by CertCo LLC.

All FPO 100 do not require the specification of a ceiling price. In this embodiment buyer will be bound to the pool with the use of legal language and commission fee and/or a cancellation fees. Here the buyer transfers all authority to the intermediary to determine the optimal bid for the pool. The buyer unconditionally accepts the final bid price and may be forced to pay a cancellation fee if he does not accept the goods. This fee can either be used to reimburse the seller for a smaller pool or used to make up the shortfall between the old bid price and the new price for fewer members of the pool. An example, would be a group of 20 people who contracted the intermediary to find them the best 5-day vacation package to Disneyland. If one person canceled, after everyone had received confirmation of the purchase, they would have to pay a cancellation fee, specified in FPO 100.

In a buyers auction embodiment, there is only a single buyer in the pool. Different from a standard auction in which the seller wishes to sell a particular item or service and seeks a buyer who is willing to pay the most for that item, in a buyer's auction, the buyer is looking for a particular item or service and it is the sellers who bid to win the business. An example would be a buyer who wishes to reserve a limousine from JFK airport to the Waldorf Astoria hotel in New York City at 10am on a certain date. The buyer enters a FPO 100 for a limousine as stated above and would then post the PPO 110 for sellers to bid on. In the buyer auction embodiment, no pooling is performed on FPO 100, the sellers bid on providing the posted service. In this embodiment the central controller 200 may provide the buyer with a maximum price of the service or alternatively the buyer may post a reserve price i.e. a maximum price he is willing to pay for the item or service. The process for the creation of FPO 100, PPO 110 and the sellers bids are as described above for FIGS. 5 to 10.

In a forward price embodiment, instead of providing a ceiling price per item, the central controller 200 provides the buyer with a list of forward prices. The list is the price of the item for a given purchase date. If a buyer could wait for the manufacturer to produce the goods, he could get a cheaper price then a buyer who needed the item immediately. The buyer who needed the goods immediately would have to compensate a supplier for the added expense of keeping an inventory on hand. This concept is similar to just in time purchasing for large corporations, but now would be available to small corporations and individuals.

Not all transactions require the transfer of money from buyer to seller. In a barter transaction the distinction between buyer and seller disappears, resulting in a contract between a number of first parties and a second party. The first party creates FPO 100 and specifies the quantity of goods he is ordering and then specifies a list of equivalent goods he is willing to receive. He may also provide a measure to equate "worth" of each of the separate items. The central controller may give him an indication of the ceiling number of each of the alternatives he may receive. This information is then aggregated into PPO 100. The second party now bids on PPO by specifying how much of a particular alternative he is ordering. Once again the optimal bid is calculated and awarded to the corresponding seller. Instead of getting cash, the second party receives goods from the first party. An example of this would be several small countries each willing to order raw materials in exchange for the delivery of medical supplies.

In an embodiment buyers can pool together to gain leverage over a manufacturer. In this case they would enter into a binding agreement with the intermediary to negotiate on their behalf. An example would be the case where buyers wanted to increase the warranty offered by the manufacturer and used the intermediary as leverage to achieve this.

Although the previous embodiments have described the delivery of goods from seller to buyer as the end of the process, there will inevitably be disputes arising from some transactions, requiring follow-up activity to resolve these disputes. The present invention can support dispute resolution in two ways.

First language can be built into every FPO 100, PPO 110 and seller bids 115 requiring that both parties submit to binding arbitration of all disputes, helping to avoid more costly and time consuming legal battles in a court of law.

Second, central controller 200 can support the arbitration process by providing an arbiter for each dispute. Such arbitration might be required when goods shipped from the seller do not correspond to the conditions of FPO 100 and PPO 110. A buyer requiring a 400 MHz Pentium II processor in his computer, for example, might seek damages against a seller who delivered a computer with a 350 MHz Pentium II processor. Instead of seeking damages, the buyer may seek replacement of the goods, such as another printer instead of the one that was malfunctioning. In arbitration involving computers, the buyer may submit a copy of the shipping documents to central controller 200 along with the tracking number of FPO 100, allowing the arbiter to establish whether or not to seller fulfilled the conditions of FPO 100 and PPO 110. Sellers may also initiate arbitration proceedings if they have shipped the goods and have not yet received payment from the intermediary.

In an alternative embodiment, transaction data can be sent to third party arbiters outside the system. Central controller 200 may send a copy of FPO 100, PPO 110, seller's bid 115 and purchase confirmation 120 to the arbiters. Cryptographic keys may also be provided to the arbiters if there are questions of authenticity or non-repudiation.

APPLICATIONS OF THE INVENTION

The above-described methods and structures of the present invention facilitate numerous buyer/seller needs. The following examples demonstrate potential needs of end users:

1) Office Supplies

A number of individuals grouping together to buy supplies for school. Also a number of small businesses grouping together to buy office supplies.

2) Medical Insurance

A number of small businesses grouping together to negotiate a better premium for their medical insurance. This could be an instance where they provide two alternative Insurers in order to provide leverage.

3) Grocery Shopping, Toys, Cosmetics, Clothing, Jewelry and watches

This is a simple implementation where individuals get the bargaining power of a large corporation by pooling their orders.

4) New Car Purchase

By buying a number of cars from a car dealer, each individual can achieve a much cheaper price.

5) Consumer Electronics, Books, Video Cassettes or Music CDs

Similar to grocery shopping, this is another simple implementation.

6) New Computer Purchases, Software and Computer Peripherals

Here a number of individuals and businesses can group together to demand a cheaper price and better warranties.

7) New Tools and Do It Yourself Equipment

Individuals and contracting corporations could group together to buy in bulk.

8) New Medical Supplies

Small countries and hospitals could form a pool to get the best quality and pricing.

9) Janitorial Supplies

This is one instance where EDI could be used to aggregate purchase orders and deliver better pricing to all.

10) Long Distance Telephone

By forming a very large pool, a group of small businesses could negotiate a better rate on their long distance. This is normally only available to large corporations.

11) Mutual Fund Purchase

Many mutual funds offer large volume purchases the ability to buy the fund at NAV. By pooling together, buyers may be able to achieve the same leverage as institutional buyers.

12) Warranty Negotiation

Here the intermediary uses its leverage as a large purchaser to negotiate a better warranty from the manufacturer. The intermediary achieves the leverage by pooling together all the individual buyers.

13) Buyer's Agent

By using the intermediary, buyers can maintain the content of their purchases confidential, thereby preventing credit card companies from maintaining databases of their purchases.

Having described preferred embodiments of the present invention, it is noted that modifications and variations can be made by persons skilled in the art in light of the above teachings. It is therefore to be understood that changes may be made in the particular embodiments of the invention disclosed which are within the scope and spirit of the invention as outlined by the appended claims.

What is claimed:

1. A computer based method for facilitating a transaction between at least two buyers, an intermediate, and at least one seller, comprising:

receiving at the intermediate a forward purchase order for at least one item from at least two buyers, said intermediate having a central controller;

forwarding a purchase stipulation from the central controller to the at least two buyers responsive to the submitted forward purchase order;

upon receiving an acceptance of said purchase stipulation, aggregating said forward purchase order to orders of like kind in a pool to form a pooled purchase order;

making the pooled purchase order including conditions of said pool to at least one seller;

receiving a bid from at least one seller;

verifying said bid with conditions of said pool;

if conditions of said pool are satisfied, binding the seller to said intermediate and storing said bid in seller database;

selecting a best bid from said database to determine a selected seller; and forwarding confirmations of sale to the at least two buyers and the selected seller.

2. The method of claim 1, wherein the purchase stipulation is a maximum offer price a buyer is willing to pay for said at least one item.

3. The method of claim 1, wherein a price set for the pooled purchase order is decreased as purchase orders of like kind aggregated is increased.

4. The method of claim 2, wherein the buyer further includes a minimum discount off the maximum offer price.

5. The method of claim 1, wherein the purchase stipulation is a commission or cancellation fee defined by the central controller.

6. The method of claim 1, wherein said forward purchase order further includes a delivery date.

7. The method of claim 1, wherein said forward purchase offer further includes earliest possible delivery of said at least one item.

8. The method of claim 1, wherein the forward purchase order further comprises a quantity specifier, a pool date, and a buyer identification.

9. The method of claim 1, further including the steps of authenticating the identification of the buyer.

10. The method of claim 9, wherein said step of authenticating is performed by said central controller by authenticating the buyer's credit card with a credit card issuer.

11. The method of claim 9, wherein the step of authenticating is performed by authenticating one of the buyer's smart card and digital cash.

12. The method of claim 7, wherein the step of authenticating the buyer's identification includes communication of cryptographic messages.

13. The method of claim 1, wherein said forward purchase order further includes a substitute item.

14. The method of claim 1, further including providing payment to the selected seller.

15. The method of claim 14, wherein the step of providing payment to the selected seller includes use of an automatic payment management system at the central controller.

16. The method of claim 14, wherein the step of providing payment includes establishing an escrow account associated with the buyer.

17. The method of claim 14, wherein the payment is by barter.

18. The method of claim 1, wherein the step of making the conditional pooled purchase offer available to the plurality of sellers further comprises granting the plurality of sellers access to a pooled purchase order database.

19. The method of claim 18, wherein the plurality of sellers are authenticated prior to being granted access to the database.

20. The method of claim 18, wherein the plurality of sellers are identified by comparing with seller identification stored in the central controller database.

21. The method of claim 19, wherein authentication of the sellers identification is performed by cryptographic means.

22. The method of claim 1, wherein said receiving and forwarding steps are performed over an electronic network.

23. The method of claim 1, wherein the purchase stipulation includes a list of different maximum offer prices based on forward purchase date.

24. The method of claim 1, further including the step of shielding buyer information by making payments from the intermediary.

25. The method of claim 1, wherein the step of receiving at the intermediate a conditional forward purchase offer for at least one item from at least one buyer is performed by a software buyer agent.

26. The method of claim 1, wherein the step of receiving a bid from at least one seller is performed by a software agent.

27. The method of claim 1, wherein the best bid is determined by the bid with the lowest price.

28. The method of claim 1, wherein the step of selecting a best bid is achieved by subdividing the conditions of the pool, and selecting winning bids from a plurality of sellers.

29. The method of claim 1, wherein the step of receiving a bid from at least one seller is responsive to said intermediate soliciting bids from at least one seller.

30. The method of claim 12, further including the step of determining at the intermediate if there are sufficient funds in the buyer's credit card account.

31. The method of claim 1, wherein said steps of receiving and forwarding between the at least one buyer, the intermediary, and at least one seller is conducted over a telephone network.

32. A computer based method for facilitating a transaction between at least one buyer, an intermediate, and at least one seller, comprising:

receiving at the intermediate a forward purchase order for at least one item from at least one buyer, said intermediate having a central controller;

forwarding a prenegotiated price for said items from the central controller to the buyer responsive to the submitted forward purchase order;

upon receiving an acceptance of said prenegotiated price; and forwarding confirmations of transaction to the buyer and the selected seller.

33. A device having computer readable code embodied therein for causing a computer to perform the method steps for facilitating a transaction between at least two buyers, an intermediate, and at least one seller, comprising:

receiving at the intermediate a forward purchase order for at least one item from at least two buyers, said intermediate having a central controller;

forwarding a purchase stipulation from the central controller to the at least two buyers responsive to the submitted forward purchase order;

upon receiving an acceptance of said purchase stipulation, aggregating said forward purchase order to orders of like kind in a pool to form a pooled purchase order;

making the pooled purchase order including conditions of said pool to at least one seller;

receiving a bid from at least one seller;

verifying said bid with conditions of said pool;

if conditions of said pool are satisfied, binding the seller to said intermediate and storing said bid in seller database;

selecting a best bid from said database to determine a selected seller; and forwarding confirmations of sale to the at least two buyers and the selected seller.

34. A method for facilitating a transaction between a buyer, an intermediate, and at least one seller, comprising:

receiving at the intermediate a forward purchase order for a goods or service from the buyer, said forward purchase order having a reserve price, said intermediate having a central controller;

forwarding a purchase stipulation from the central controller to the buyer responsive to the submitted forward purchase order;

receiving an acceptance of said purchase stipulation;

posting at said central controller said forward purchase order;

receiving a bid from at least one seller;

verifying said bid with conditions of said forward purchase order;

if conditions of said forward purchase order are satisfied, store bid in seller database;

selecting a best bid from said database to determine a selected seller; and forwarding confirmations of sale to the buyer and the selected seller.

35. The method of claim 34, wherein said reserve price is a maximum price the buyer will pay for the goods or service.

36. The method according to claim 32, further including the step of aggregating forward purchase orders of like kind in a pool to form a pooled purchase order.

37. The method according to claim 34, further including the step of aggregating forward purchase orders of like kind in a pool to form a pooled purchase order.

* * * * *